United States Patent
Blixt

(10) Patent No.: US 8,471,861 B2
(45) Date of Patent: Jun. 25, 2013

(54) METHOD AND SYSTEM FOR COST-EFFICIENT, HIGH-RESOLUTION GRAPHICS/IMAGE DISPLAY SYSTEM

(75) Inventor: Stefan Blixt, Bålsta (SE)

(73) Assignee: Imsys AB, Upplands Vasby (SE)

( * ) Notice: Subject to any disclaimer, the term of this patent is extended or adjusted under 35 U.S.C. 154(b) by 929 days.

(21) Appl. No.: 12/159,090

(22) PCT Filed: Dec. 15, 2006

(86) PCT No.: PCT/SE2006/001431
§ 371 (c)(1),
(2), (4) Date: Jun. 25, 2008

(87) PCT Pub. No.: WO2007/075134
PCT Pub. Date: Jul. 5, 2007

(65) Prior Publication Data
US 2009/0002385 A1    Jan. 1, 2009

Related U.S. Application Data

(60) Provisional application No. 60/753,420, filed on Dec. 27, 2005.

(51) Int. Cl.
*G06T 9/00* (2006.01)
(52) U.S. Cl.
USPC ............................ 345/555; 345/519; 345/522
(58) Field of Classification Search
USPC ............................ 345/522, 555, 519; 382/232
See application file for complete search history.

(56) References Cited

U.S. PATENT DOCUMENTS

| 5,512,921 A | 4/1996 | Mital et al. |
| 5,835,082 A | 11/1998 | Perego |
| 5,961,617 A | 10/1999 | Tsang |
| 6,002,411 A * | 12/1999 | Dye .............................. 345/542 |
| 6,014,133 A | 1/2000 | Yamakado et al. |
| 6,359,625 B1 | 3/2002 | Perego |
| 2005/0140685 A1 | 6/2005 | Garg |

FOREIGN PATENT DOCUMENTS

| WO | 98/47075 A1 | 10/1998 |
| WO | WO00/25205 | * 5/2000 |

OTHER PUBLICATIONS

European Search Report in corresponding PCT/SE2006001431 dated Oct. 6, 2009.

* cited by examiner

*Primary Examiner* — Said Broome
*Assistant Examiner* — Peter Hoang
(74) *Attorney, Agent, or Firm* — Young & Thompson

(57) ABSTRACT

An image display system comprises a processor 10, a main memory 20 and a display panel 30, where the main memory 20 includes an uncompressed image area 24 for storing image data relating to an image and a compressed image area 26 for storing compressed image data. The processor is microcode-programmed, and executes, after changes have been made in the uncompressed image area, a special sequence of microcode words in a micro program memory 12 of the processor for compressing at least those parts of the uncompressed image area that are subject to changes. The microcode-compressed parts of the image data are then stored in the compressed image area 26 of the main memory. Compressed image data may then be fetched from the compressed image area 26 and decompressed for enabling generation of an appropriate image signal. The generated image signal can finally be applied to the display 30 for refreshing the image.

30 Claims, 12 Drawing Sheets

METHOD AND SYSTEM FOR COST-EFFICIENT, HIGH-RESOLUTION GRAPHICS/IMAGE DISPLAY SYSTEM

TECHNICAL FIELD

The present invention generally relates to computer technology and image display systems.

BACKGROUND

Image display systems are generally used in computers, mobile phones, and other digital systems to provide a graphical user interface. Most types of display devices, such as CRTs and LCD panels, require repetitive refresh of the image contents, typically 50-70 times per second. To this end, the display screen (the phosphor screen in the CRT and the liquid crystal layer in the LCD) is scanned at high speed e.g. from left to right (line scan) and a lower speed from top to bottom (frame scan). In an LCD this is done by electrically activating horizontal and vertical transparent electrodes on the glass surfaces. This refreshing requires pixel data to be retrieved in this order at the required rate, from a stored digital representation of the image. The line and frame scan frequencies are selected such that the available frame refresh period is utilized as well as possible so that the needed data rate will not be unnecessarily high. Thus, a video signal must be generated, all the time, at a high and steady data rate (in some systems short interruptions at end of line and of frame are required), and the generation of this signal requires reading from a memory that stores data for every pixel in the image.

This storage of the image for display refresh may use a separate frame buffer memory or, alternatively, an area in the main memory of a general microprocessor or micro controller may be used. In the latter case this processor would also be the one that creates and modifies the contents of the image area under control of an application program, which would typically call graphics subroutines for the drawing of text symbols and primitive shapes, and perhaps image decompression subroutines (e.g. JPEG) for processing photographic images. In some systems disturbing temporary image distortions may appear, e.g. flashes of incomplete objects, when changes in the image area are not properly synchronized with refresh.

A separate frame buffer memory represents a relatively high cost, but it is often used in high-resolution systems, because the high data rate required for refresh would otherwise considerably reduce the main memory bandwidth available for the processor, and thus make the application program go slower.

There are thus conflicting requirements with respect to cost on one hand and efficiency on the other hand.

RELATED ART

U.S. Pat. No. 5,961,617 relates to a system and technique for reducing power consumed by a data transfer operation during periods of update inactivity. Normally, the system displays uncompressed image data, which is stored in an image memory. After a period of display inactivity a display processor compresses uncompressed data and writes compressed data to another location in the image memory. In subsequent display cycles, until there is display activity, the display processor retrieves the compressed data from memory, decompresses it in real time and transfers decompressed data to the display.

U.S. Pat. No. 5,512,921 relates to a visual display system based on a microprocessor having a low energy data storage subsystem with compression capabilities using a compressed frame buffer for storing the visual information in a compressed format. The display system has both an uncompressed and a compressed version of the display image stored in memory, and the aim is to reduce power consumption by selecting, for refresh, the uncompressed version or, if it is ready, the compressed version, depending on which alternative will have the lowest power consumption.

SUMMARY

It is an object of the invention to provide an improved image display system as well as a novel method for updating and refreshing an image in such a system.

It is a general object to provide a cost-effective and at the same time efficient display system having a reasonable or high performance standard.

In particular it is desirable to provide a display system where the complete image data is held in main memory only, but where the number of bits per frame in refresh data flow has been reduced, allowing for more program execution time and/or higher frame rate.

It is also an object to provide a processor for use in an image display system.

A main aspect of the invention relates to an image display system having a processor, a main memory associated with the processor, and a display panel, where the main memory has an uncompressed image area where the image contents are created by the application, and a compressed image area from where image data is regularly fetched for refreshing the display panel.

A basic idea according to the invention is to use a microcode-programmed processor, and execute, after changes have been made in the uncompressed image area of the processor's main memory, a special sequence of microcode words in a micro program memory of the processor for compressing at least those parts of the uncompressed image area that are subject to changes. The microcode-compressed parts of the image data are then stored in the compressed image area of the main memory.

Compressed image data may then be fetched from the compressed image area and decompressed for enabling generation of an appropriate image signal. The generated image signal can finally be applied to the display for refreshing the image.

In this way, it is possible to save cost and/or allow for higher display resolution, by letting a microcode-programmed processor (CPU) refresh the display using compressed display data in its own main memory. Having the data compressed allows for higher resolution without taking too much of the memory bandwidth for refresh, and using the CPU's own memory instead of an additional memory further reduces the system cost.

The invention also allows changes of a limited part of the image contents without having to recompress the entire image, thus keeping the response time short for most types of image changes.

In general, a microcode-programmed processor is a processor in which the general standard operation of the processor is controlled by sequences of microcode words in an internal micro program memory. This should not be confused with the expression "microprocessor", which simply means that the processor is built as an integrated circuit. Naturally, a microcode-programmed processor may also be built as an integrated circuit, but a microprocessor is not by definition equipped with a micro program for controlling its internal operation.

By using a microcode-programmed processor, the microcode-implemented compression task(s) can be executed 'time-shared' with the ordinary, standard control operations of the processor core, utilizing the same hardware resources.

In a particular embodiment of the invention, the special sequence of microcode words is preferably also responsible for writing the compressed parts of the image data into the compressed image area of the processor's main memory in a way that ensures that only complete image objects are output to the compressed image area. This means that there is no risk for output of defective (incomplete) line segment data, which otherwise might result in distortion of the displayed image.

The special sequence of microcode words for image compression is normally triggered as and when needed. For example, an application program, running from main memory, may perform changes in the image in the uncompressed image area and then, in order to make the changes visible on the screen the application calls a routine, which in turn invokes the special microcode sequence for compression.

In an exemplary embodiment of the invention, the special sequence of microcode words is preferably adapted for performing compression according to a first transformation process to ensure a given level of compression, and, when there is available processing time, performing further compression according to a second transformation process to improve the compression kevel if possible.

DETAILED DESCRIPTION

Figure 1:
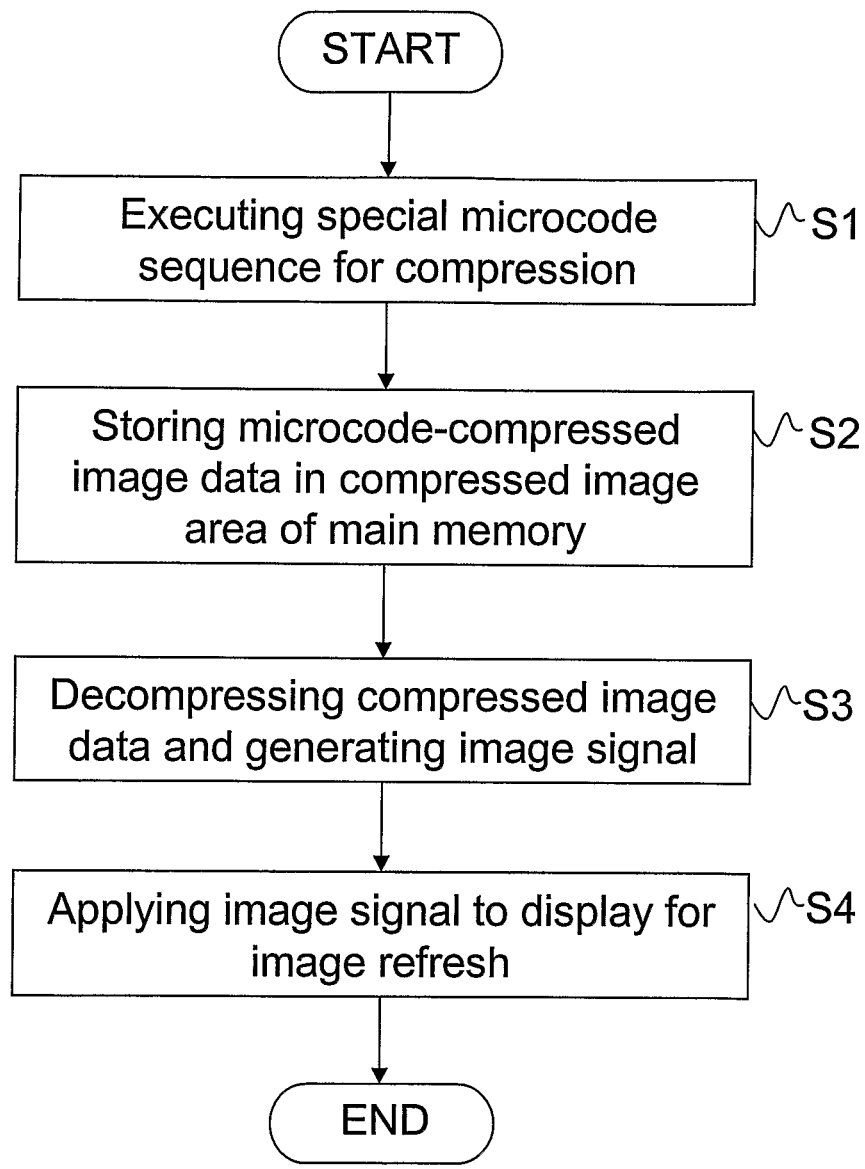
FIG. 1 is a schematic flow diagram of a basic method for updating and refreshing an image in a display system according to an exemplary embodiment of the invention.

It is desired to provide a system comprising a processor and a display system, which is designed in a particular way that leads to cost efficiency. The processor is normally of a kind that is micro-programmed, i.e. its internal operation is controlled by microcode in an internal micro program memory (a.k.a. control store). Although any type of display can be used with the invention, the display is normally an LCD panel or equivalent, and its resolution is fairly high.

For a better understanding of the invention it may be useful to begin with a brief overview of basic processor technology and programming.

In general, a processor executes a program. A program includes instructions, which are stored as a sequence of bytes in a memory. An instruction, also called a machine instruction or macroinstruction, can (in the general case) consist of one or several bytes, and contains an opcode field defining its basic function, e.g. an arithmetic operation or a conditional jump in the execution sequence (instead of continuing to the next instruction). The instruction may contain other fields that may specify one or more operands. The program (sequence of instructions in the memory) has usually been produced, beforehand, by a compiler or assembler—a tool that itself is a program which takes the programmer's source code text as input.

A processor may be built as an integrated circuit, which is then called a microprocessor.

Normally other devices can be connected to the processor and exchange data with it. These are called peripherals. Some can contain electromechanics (e.g. a printer or hard disk), but some can be purely electronic. They all have digital control electronics for interfacing with the processor, and usually also for their internal control.

It is very common to add memory and peripheral electronics on the same IC chip as the processor, in order to reduce the parts count in an embedded system (a digitally controlled device that is not a PC or server computer). The IC is then called a microcontroller, and the processor part of it is called the processor core.

The processor core is a digital device that can perform different sets of actions for each cycle of a high-frequency clock signal. The core typically includes two main parts, or units. One is the arithmetic, or data path, unit, where data can be taken in (from memory or peripherals), operated on, temporarily stored in registers, and/or output (to memory or peripherals). The other part is the control unit, which, for every cycle of the clock, controls the actions of the arithmetic unit and itself, based on the state reached in the previous cycle.

The control signals created by the control unit can be generated by digital gates that sense the opcode and the state of a sequence counter, but an alternative used in more complex processors is to generate them from microcode words (also referred to as microinstuctions). These can be thought of as words consisting of bits or bit fields, each representing control signals as defined by their positions in the word, and each word specifying the respective signal levels to be produced during the current clock cycle. The technique is similar to that used in old jacquard looms, player pianos, and pegged drum controllers for old washing machines or music boxes (also used in clock chiming mechanisms from the 14th century). Each microinstruction corresponds to a line of holes in the paper roll for a player piano, and all the lines of holes on the paper roll together correspond to a micro program stored in a control store, or micro program memory. This special (wide and fast) memory, internal to the control unit of the processor core, outputs a microinstruction for every clock cycle. A difference from the player piano is that the microinstruction sequence can contain jumps, i.e. control does not always pass from one microinstruction to the next one in the stored sequence. The core has an execution circuit to execute the microinstructions.

The micro program is normally contained in the processor core (and not in the main memory where the application program is stored). The micro program controls the details of the processor core as it first fetches a machine instruction from the application program in the main memory and then executes this instruction in the arithmetic unit.

Thus, typically, the microcode controls the processor hardware to perform various base functions such as:

accessing the memory, with the address of the next instruction;

reading the instruction from memory and store it in the instruction register;

incrementing the instruction pointer register;
decoding the instruction, determine where to jump in the microcode to execute this opcode;
fetching the operands specified by the instruction;
performing the operation specified;
storing the result as specified; and
fetching the next instruction (if no interrupt has been requested).

The main memory is always necessary and if the system needs a big main memory for application programs and data (e.g. a system using Java and/or Internet communication) it is much less expensive to store an image in this memory than in an extra memory component added only for that purpose.

The invention relates to a display system where the complete image data is held in main memory only, but where the data flow has been reduced, allowing more program execution time and/or higher frame rate.

FIG. 1 is a schematic flow diagram of a basic method for updating and refreshing an image in a display system according to an exemplary embodiment of the invention.

A basic idea according to the invention is to use a microcode-programmed processor, and execute, after changes have been made in the uncompressed image area of the processor's main memory, a special sequence of microcode words in a micro program memory of the processor for compressing at least those parts of the uncompressed image area that are subject to changes (step S1). The microcode-compressed parts of the image data are then stored in the compressed image area of the main memory (step S2). The signals to the display panel are generated from the data in this area. Hence, compressed image data from the compressed image area can be decompressed for enabling generation of an appropriate image signal (step S3). The generated image signal, which typically consists of several bits in parallel for each color component (red, green, blue), together with a dot clock signal (one pulse per pixel) and line and frame synchronization signals, can finally be applied to the display for refreshing the image (step S4).

In this way, it is possible to save cost and/or allow for higher display resolution, by letting a microcode-programmed processor (CPU) refresh the display using compressed display data in its own main memory, without the need to use a memory controller or a separate display processor.

The invention also allows changes of a limited part of the image contents without having to recompress the entire image, thus saving valuable memory bandwidth and leaving more time for the processor's execution of the application program.

In a particular embodiment of the invention, the special sequence of microcode words is preferably also responsible for writing the compressed parts of the image data into the compressed image area of the processor's main memory to ensure that only complete image data is output to the compressed image area. This means that there is no risk for output of defective (incomplete) line segment data, which otherwise might result in distortion of the displayed image.

As previously mentioned, the CPU instructions are executed by microcode sequences in the micro program memory. Drawing of graphics shapes can be done using special CPU instructions, i.e. sequences of microcode that are invoked by special opcodes that are added to the normal instruction set architecture (ISA) of the CPU. But further processing of the image need not be performed directly under CPU program control. It can be done by microcode sequences that are executed between the CPU instructions, invoked by a regular timer interrupt signal and/or interrupt requests from input/output units as and when needed. In this way, the microcode-implemented/compression task(s) can be executed 'time-shared' with the ordinary, standard control operations of the micro-programmed processor core.

For example, an application program, running from main memory, may perform changes in the image in the uncompressed image area and in order to make the changes visible on the screen the application calls a routine, which in turn invokes the special microcode sequence for compression.

Figure 2:
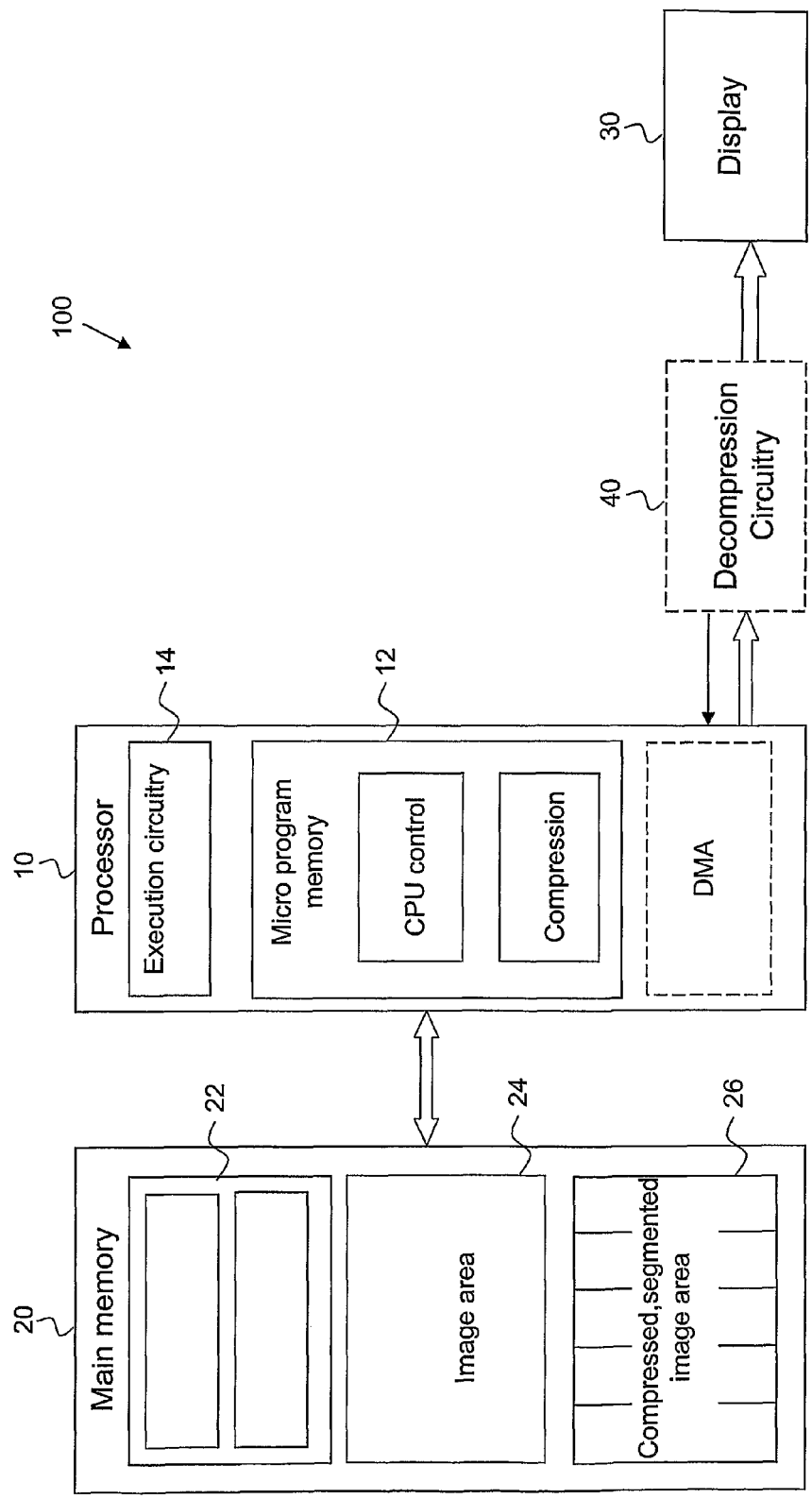
FIG. 2 is a schematic block diagram of a basic image display system according to an embodiment of the invention.

FIG. 2 is a schematic block diagram of a basic image display system according to an embodiment of the invention. Basically, the display system 100 comprises a processor 10, a main memory 20 and a display 30, and optional decompression circuitry 40. The main memory 20 has memory areas 22 for application programs and various operating system routines, an uncompressed image area 24 for storing image data relating to an image and a compressed image area 26 for storing compressed image data. The processor 10, also referred to as a central processing unit (CPU), is microcode-controlled, meaning that the internal operation of the CPU is controlled by micro code words in a CPU-internal micro program memory 12. Execution circuitry 14 executes the microcode. The micro program memory 12 is here equipped with a special sequence of microcode words for compressing at least those parts of the uncompressed image area 24 that are subject to changes. The microcode-compressed parts of the image data are then stored in the compressed image area 26 of the main memory 20. Compressed image data can be fetched from the compressed image area 26, for example by direct memory access (DMA) transfer, and decompressed by the decompression circuitry 40 to enable generation of an appropriate image signal. Once an image signal has been generated, the signal can be applied to the display for image refresh. It should be understood that the decompression circuitry could easily be integrated with the processor or the display drive electronics.

As explained, there is an uncompressed image area in main memory, in which the graphics image is drawn. Normally the application redraws limited parts of this image, e.g. inserting/moving/deleting text characters, lines, or other graphics primitives. In the main memory there is also another area, which contains compressed image data. The signals to the display panel are generated from the data in this area. This data is fetched, approximately in phase with the refresh scanning of the display panel, for example by external logic 40 using direct memory access (DMA).

Compression (from the first to the second area) is normally done after something has changed in the uncompressed area, but usually only a small part of the image is compressed. Unchanged parts are preferably not processed.

Decompression is done continuously by the video signal generation. This process normally needs two FIFO (first in first out) buffer memories, but these are very small compared to the image data size.

U.S. Pat. No. 5,961,617 has a display processor and a memory controller, both distinct from the CPU (central processor unit) of the system, and the primary object is to save power, by sometimes (when display update activity is low) using compressed video data to refresh the display.

U.S. Pat. No. 5,512,921 describes a system that has both an uncompressed and a compressed version of the display image stored in its memory, and can use either one or the other for refresh. In this system the aim is to reduce power consumption by selecting the uncompressed or, if it is ready, the compressed version, depending on which alternative will have the lowest power consumption.

The present invention is different from both of these patents. It does not normally use uncompressed data for refresh, which both of the above-mentioned patents do. It can save power but its primary aim is to save cost and/or allow for higher display resolution, by letting a micro-programmed CPU, preferably without the aid of a memory controller or a display processor, refresh the display using compressed display data in its own main memory. Having the data compressed allows for higher resolution without taking too much of the memory bandwidth, and using the CPU's own memory instead of an additional memory reduces the system cost.

The compression method should preferably fulfill certain criteria. Compression after an update should typically be fast enough, and the compressed version of the entire image should be small enough, and be ready for output of the data the display needs for refresh. These criteria are not relevant in the above-mentioned patents.

In a preferred exemplary embodiment of the invention, the system uses a special compression method having certain characteristics:

The graphics microcode can change a limited part of the image contents without having to recompress the entire image. This is important for an interactive display.

Also, the compression method is suitable for doing compression in microcode, while also suitable, if desired, for decompression in simple hardware logic outside the processor. Furthermore, the method should preferably not be worse than a certain limit even in the worst case, since the video signal must never be delayed more that a certain limited period of time.

In an exemplary embodiment of the invention, the special sequence of microcode words is preferably adapted for performing compression according to a first transformation process to ensure a given level of compression, and, when there is available processing time, performing further compression according to a second transformation process to improve the compression level if possible.

Microcode can also be used for other tasks in the processor, not directly connected with the execution of machine instructions of the program in the main memory. Such tasks may be initiated at regular intervals or on special events, and are then usually performed after finishing a machine instruction and before starting on the next one. Examples are error-handling, single-step, interrupt acknowledge, real-time clock update, but also many other functions can be performed this way.

In an exemplary preferred embodiment of the invention, the software creates and modifies the image in an uncompressed image area in memory. Typically it uses primitive basic routines for drawing lines, filling areas, etc, often called graphics primitives and belonging to a collection of routines, e.g. a graphics API (Application Program Interface). In a preferred embodiment of the invention this API is MIDP, which is an extension to the Java Virtual Machine version developed for small devices such as mobile phones. The application program uses a number of calls to primitives when changing the image, and then calls a special routine to make the change visible on the screen. This routine uses special microcode, which performs compression on a rectangular area of the image. This area is not much bigger than the smallest rectangle containing the change. One compressed line segment, a part of a scan line, from edge to edge of the rectangle, is written at a time (i.e. without interruption by other activity) in the compressed image area. The compression method must be such that each such line segment can be compressed and decompressed independently of all others. One consequence of this is that they start at a limited number of alternative x coordinates.

In a preferred embodiment the image width is divided into e.g. five vertical bands, and the independent line segments go horizontally from edge to edge across one such band. In a preferred exemplary embodiment of the invention, the microcode handles both the writing and reading of compressed data, always handling entire compressed line segments, which means that there is no risk for output of defective (incomplete) line segment data, which otherwise might result in derailing of the decompression process and thus distortion of the displayed image.

The text below describes a particular implementation according to an exemplary embodiment of the invention, and the invention is not limited thereto. In this particular example, the system uses Java, and "ServiceRepaints( )" is a routine in the Java Virtual Machine software, which initiates the "drawing" of graphics image details that have previously been specified by the application software.

Figure 3:
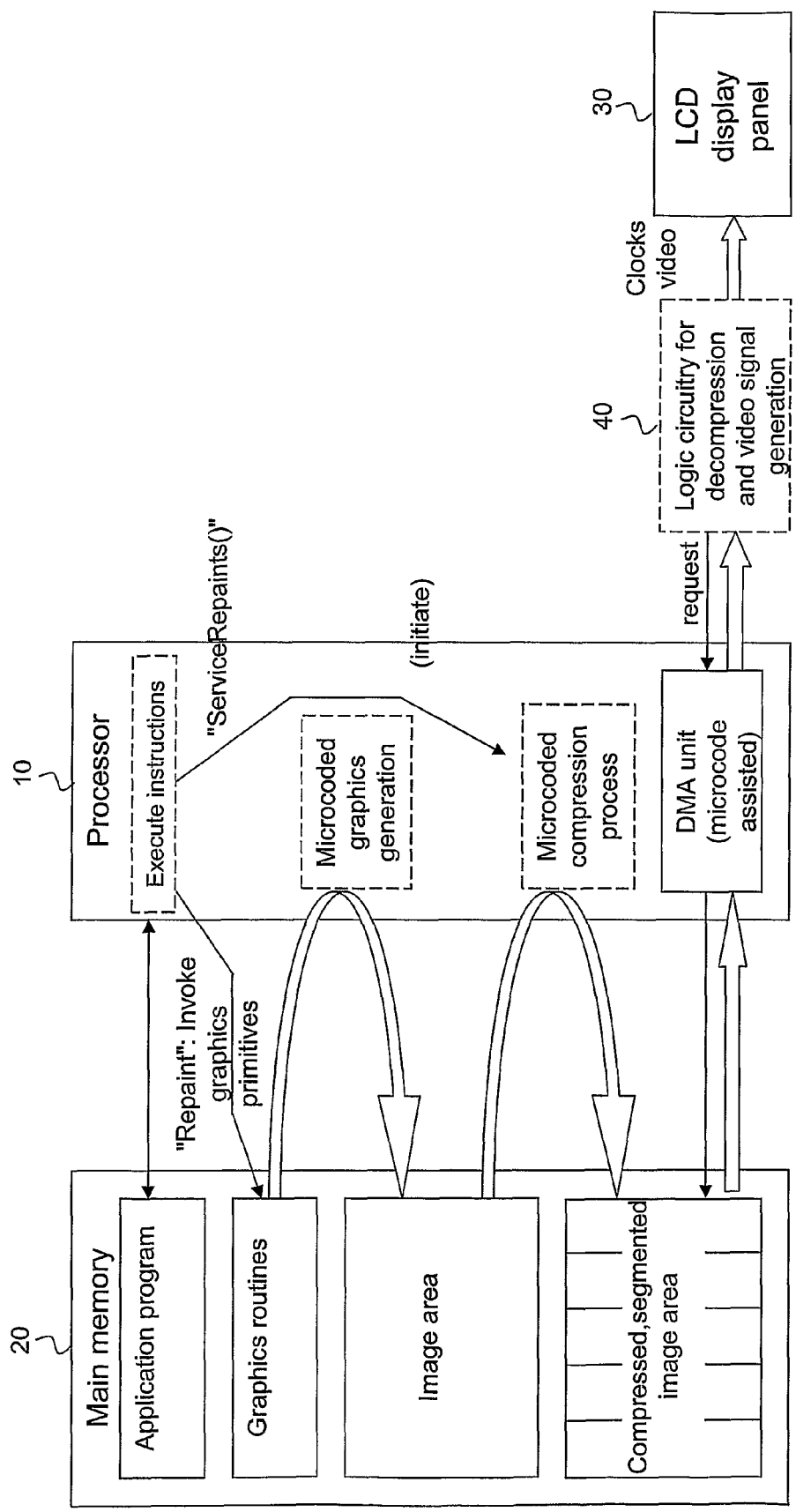
FIG. 3 is a schematic block diagram of an example of an image display system according to a preferred exemplary embodiment of the invention.
Figure 4A:
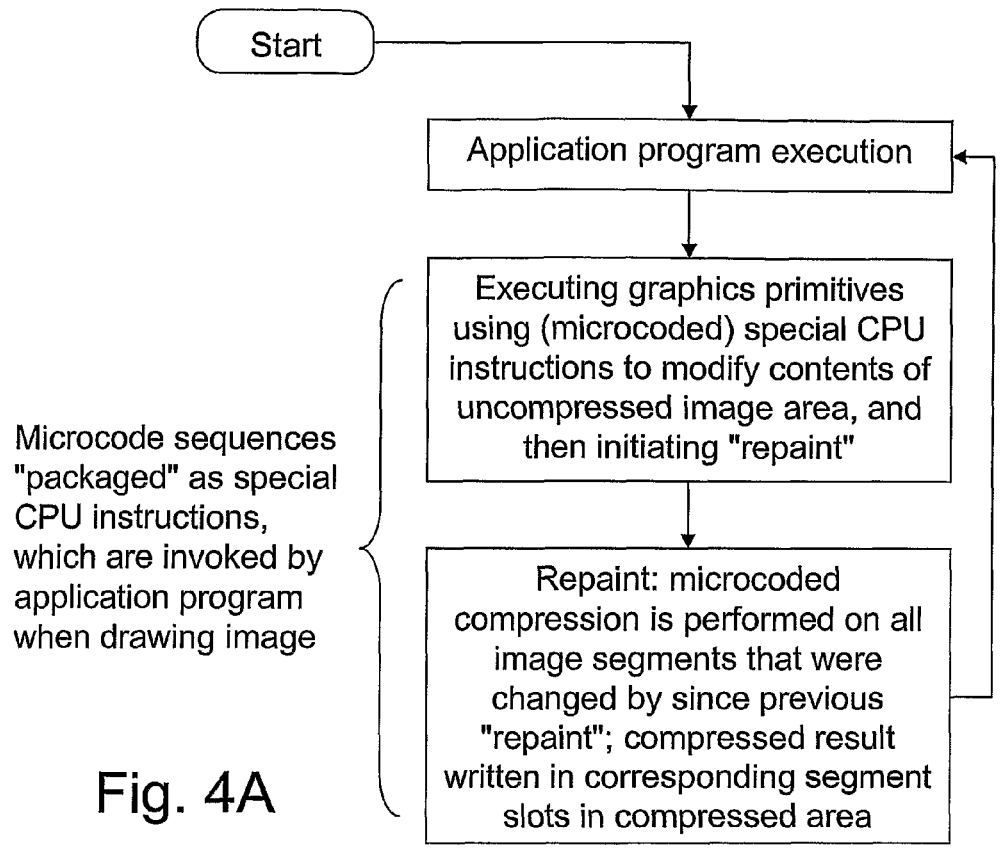
FIGS. 4A-E are schematic flow diagrams according to a preferred exemplary embodiment of the invention.
Figure 4B:
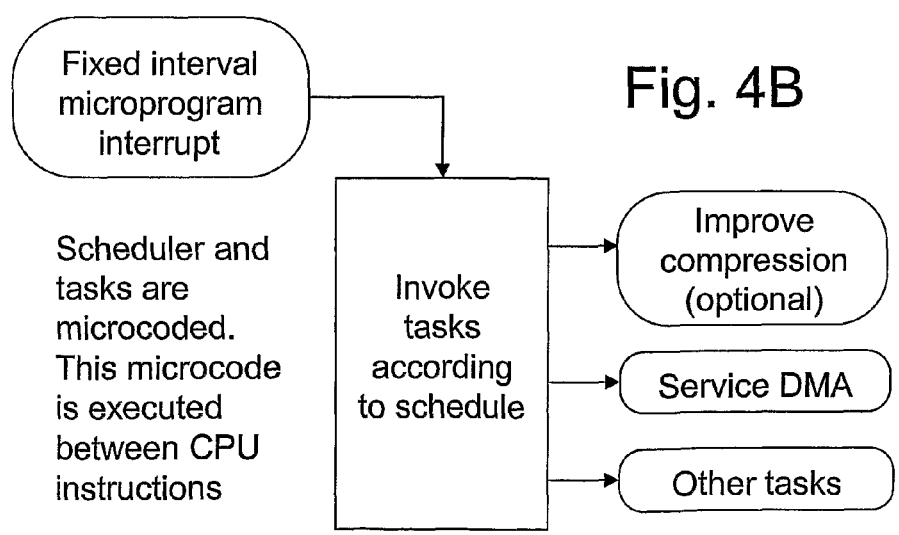
Figure 4C:
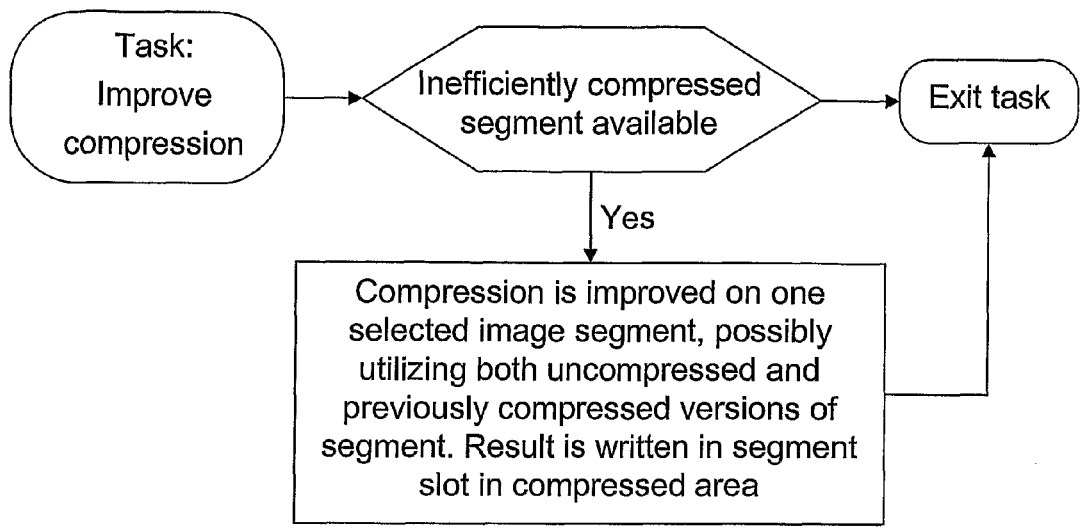
Figure 4D:
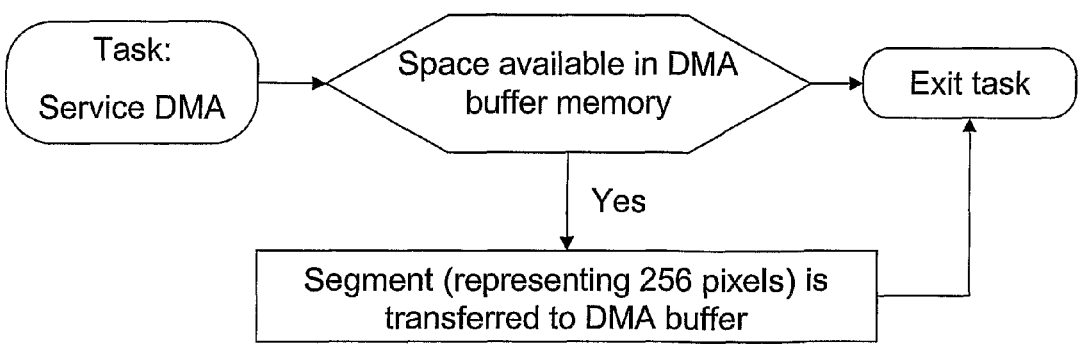
Figure 4E:
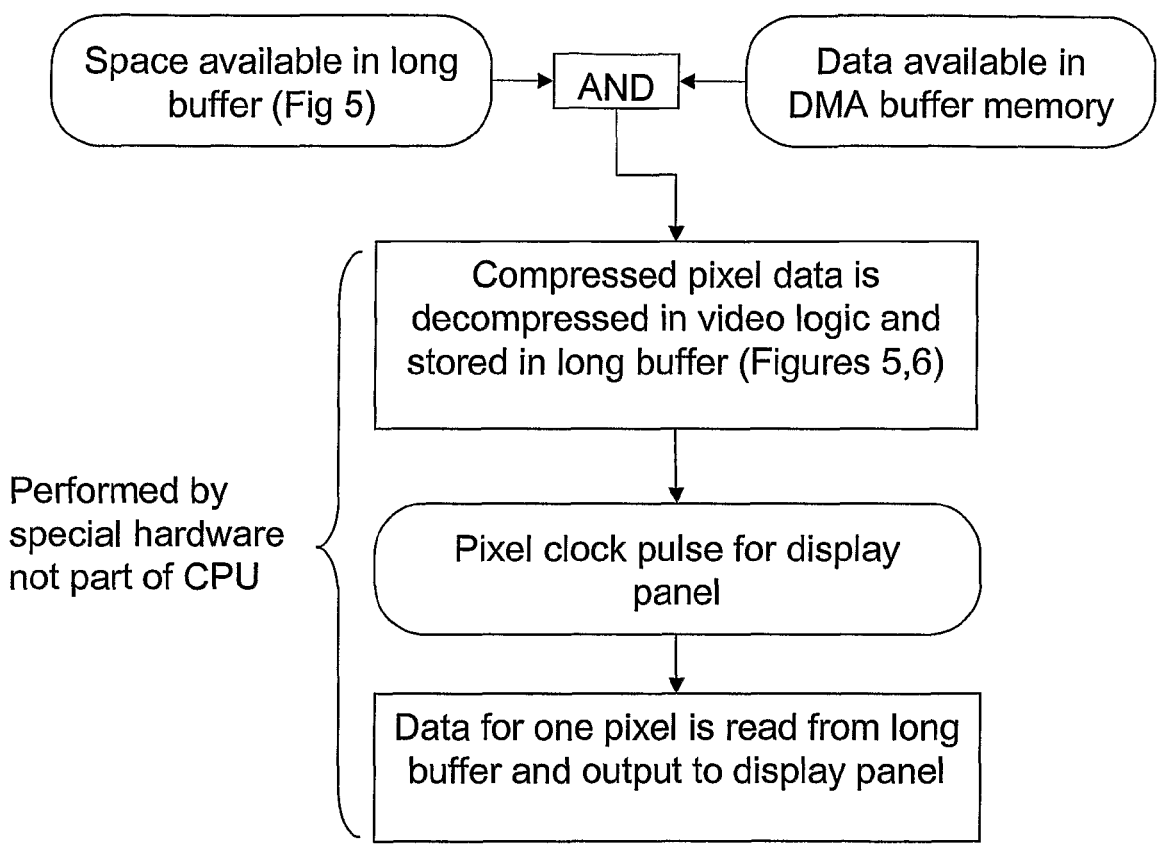

FIG. 3 is a schematic block diagram of an example of an image display system according to a preferred exemplary embodiment of the invention. It shows an exemplary processor 10 and its main memory 20 and an LCD display panel 30 or equivalent display. The main memory 20 is here e.g. a cost-efficient dynamic RAM, i.e. physically separate from the processor, but processor and memory could in future systems be integrated on the same chip. Between the processor 10 and the display 30 is shown an optional, but often preferred block 40 containing logic and small memories. In the preferred embodiment this block is a small FPGA (field-programmable gate array), but it could easily be integrated with either the processor or the LCD drive electronics (or possibly both) on one chip.

The main memory 20 contains the Application program, typically the customer's or user's software, consisting of machine instructions and compiled from source code written in Java, C, and assembler. It also contains the "firmware", the programs belonging to the "platform", including operating system and APIs for different groups of functions. Here is shown the Graphics routines, which are called by the Application program when needed. Also shown is an Image area, where the Graphics routines draw image objects, for example aided by microcoded graphics generation code in the micro program memory. The microcoded compression process is usually initiated by a certain routine that is called when the Application program wishes to have the image updated. This process reads video data for (mainly) the affected line segments in the uncompressed Image area, compresses these, and stores the result in the Compressed segmented image area, where each segment has its dedicated space. The compression of a line segment is totally independent of all others, i.e. if only one segment has been changed, then only that segment needs to be compressed, all other contents of the Compressed segmented image area remain the same.

For the interested reader, reference can also be made to the illustrative flow diagrams of FIGS. 4A-E. Graphics primitives can be called by the Application program when needed. Drawing of graphics shapes can be done using special CPU instructions, i.e. sequences of microcode that are invoked by special opcodes that are added to the normal instruction set architecture (ISA) of the CPU. Compression as well as other tasks such as further (optional) compression and direct memory access (DMA) can be performed and scheduled by microcode sequences that are executed between the CPU instructions, invoked by a regular timer interrupt signal and/or interrupt requests from input/output units as and when needed. Decompression is preferably done by special hardware, not part of the CPU, as will be explained in detail below.

Figure 5:
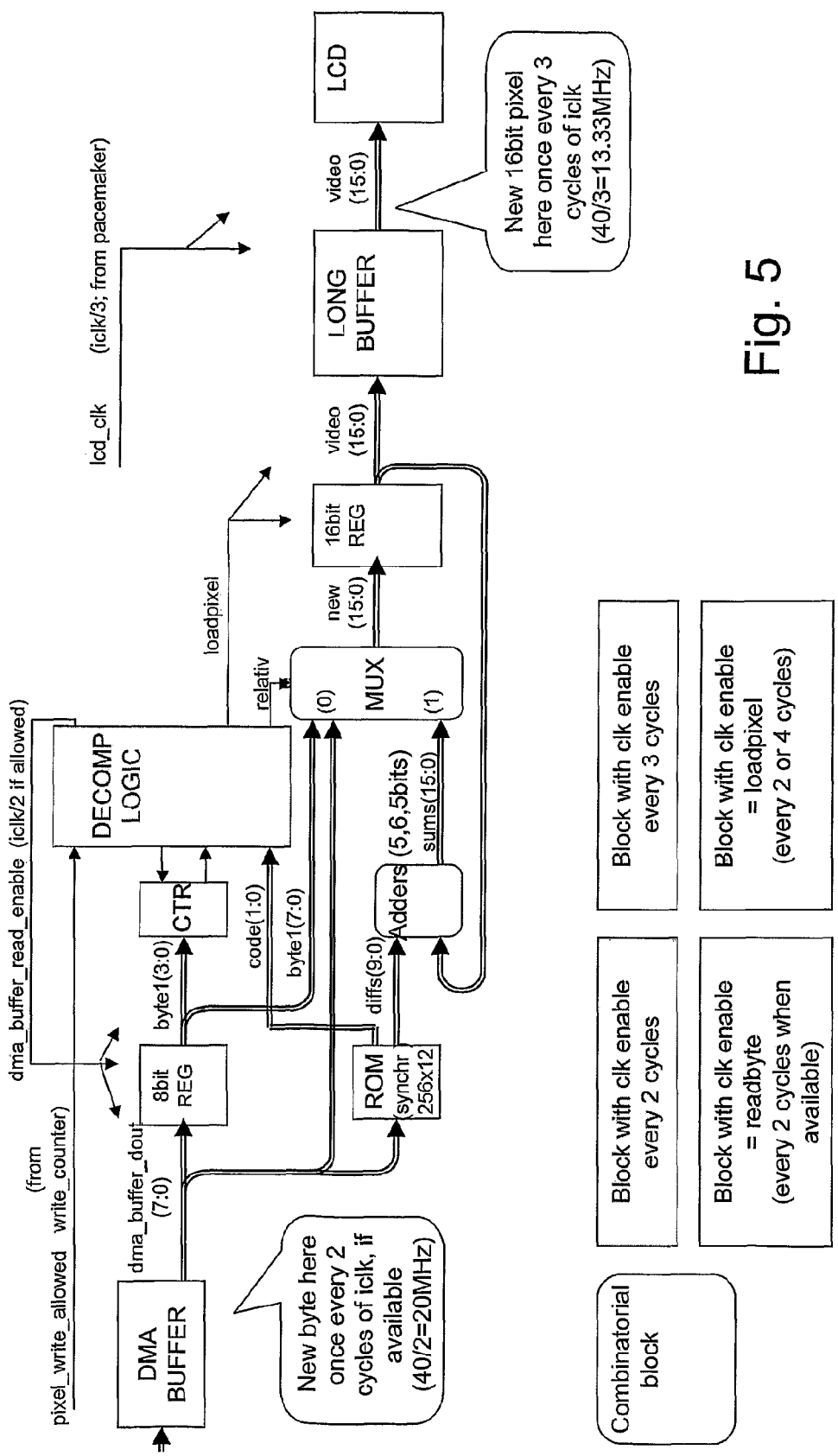
FIG. 5 shows an example of the decompression logic, which in this particular example corresponds to a part of the contents of an FPGA.

FIG. 5 shows an example of the decompression logic, which in this particular example corresponds to a part of the contents of an FPGA. Preferably, compressed video data from the main memory via the processor is fed, on request from this logic, into a small FIFO (first-in-first-out) buffer memory. The object of this buffer is to buffer data such that the logic reading from it will not have to wait during the short time intervals when the processor is unable to respond to the request. The compressed video data contains code words, which are decoded by a ROM (e.g. 256 words of 12 bit each), as can be seen from Table I below. It also contains uncompressed pixel data in certain cases, and data is therefore also passed to a multiplexor (mux). This mux selects either this data (e.g. 8 bits wide) directly, together with the previous 8 bits that has been stored in an 8-bit register, or reconstructed 16 bit wide pixel data from three adders, 5,6,5 bits wide, which add increments to the previously generated pixel. This preceding pixel data is stored in a register that is fed from the mux. The three increments come from the ROM. The ROM is addressed by the 8-bit code word. Most of the code words are used for increments to each color component; increments that should be added to preceding pixel values in order to obtain the new values. Each such 8bit code word corresponds to one 12bit word in the ROM, containing one 3bit field for red increment, one 4bit field for green increment, and one 3bit field for blue increment. Each increment code is defined such that the represented range of values are centered around zero, i.e. 7 of the 8 possible bit contents of each of the red and blue fields have been selected to represent the values −3, −2, −1, 0, +1, +2, +3, and 25 of the 16 possible combinations in the green field similarly represent −7 . . . +7.

This leaves a number of possible 8bit codes that are not needed for increments. They are used for other functions, such as telling the logic to treat the next 2 bytes in the input stream as one uncompressed pixel, or the next 4 bytes as 2 uncompressed pixels, etc. Some code words are also used to specify repetition of the last pixel a number of times, which will often result in efficient further compression. Details for this particular exemplary implementation should be clear from studying Table I below.

TABLE I

| Address | Differences | | | | | | | | | | |
|---------|---|---|---|---|---|---|---|---|---|---|---|
| | rdiff | | | gdiff | | | | bdiff | | | |
| (hex) | b9 | b8 | b7 | b6 | b5 | b4 | b3 | b2 | b1 | b0 | |
| 00 | 0 | 0 | 0 | 0 | 0 | 0 | 0 | 0 | 0 | 0 | rdiff = 0; gdiff = 0; bdiff = 0 |
| 01 | 0 | 0 | 0 | 0 | 0 | 0 | 0 | 0 | 0 | 1 | rdiff = 0; gdiff = 0; bdiff = 1 |
| 02 | 0 | 0 | 0 | 0 | 0 | 0 | 0 | 0 | 1 | 0 | rdiff = 0; gdiff = 0; bdiff = 2 |
| 03 | 0 | 0 | 0 | 0 | 0 | 0 | 1 | 1 | 1 | 0 | rdiff = 0; gdiff = 1; bdiff = −2 |
| 04 | 0 | 0 | 0 | 0 | 0 | 0 | 1 | 1 | 1 | 1 | rdiff = 0; gdiff = 1; bdiff = −1 |
| 05 | 0 | 0 | 0 | 0 | 0 | 0 | 1 | 0 | 0 | 0 | rdiff = 0; gdiff = 1; bdiff = 0 |
| 06 | 0 | 0 | 0 | 0 | 0 | 0 | 1 | 0 | 0 | 1 | rdiff = 0; gdiff = 1; bdiff = 1 |
| 07 | 0 | 0 | 0 | 0 | 0 | 0 | 1 | 0 | 1 | 0 | rdiff = 0; gdiff = 1; bdiff = 2 |
| 08 | 0 | 0 | 0 | 0 | 0 | 1 | 1 | 1 | 1 | 0 | rdiff = 0; gdiff = 2; bdiff = −2 |
| 09 | 0 | 0 | 0 | 0 | 0 | 1 | 0 | 1 | 1 | 1 | rdiff = 0; gdiff = 2; bdiff = −1 |
| 0A | 0 | 0 | 0 | 0 | 0 | 1 | 0 | 0 | 0 | 0 | rdiff = 0; gdiff = 2; bdiff = 0 |
| 0B | 0 | 0 | 0 | 0 | 0 | 1 | 0 | 0 | 0 | 1 | rdiff = 0; gdiff = 2; bdiff = 1 |
| 0C | 0 | 0 | 0 | 0 | 0 | 1 | 0 | 0 | 1 | 0 | rdiff = 0; gdiff = 2; bdiff = 2 |
| 0D | 0 | 0 | 0 | 0 | 0 | 1 | 1 | 1 | 1 | 0 | rdiff = 0; gdiff = 3; bdiff = −2 |
| 0E | 0 | 0 | 0 | 0 | 0 | 1 | 1 | 1 | 1 | 1 | rdiff = 0; gdiff = 3; bdiff = −1 |
| 0F | 0 | 0 | 0 | 0 | 0 | 1 | 1 | 0 | 0 | 0 | rdiff = 0; gdiff = 3; bdiff = 0 |
| 10 | 0 | 0 | 0 | 0 | 0 | 1 | 1 | 0 | 0 | 1 | rdiff = 0; gdiff = 3; bdiff = 1 |
| 11 | 0 | 0 | 0 | 0 | 0 | 1 | 1 | 0 | 1 | 0 | rdiff = 0; gdiff = 3; bdiff = 2 |
| 12 | 0 | 0 | 0 | 0 | 1 | 0 | 0 | 1 | 1 | 0 | rdiff = 0; gdiff = 4; bdiff = −2 |
| 13 | 0 | 0 | 0 | 0 | 1 | 0 | 0 | 1 | 1 | 1 | rdiff = 0; gdiff = 4; bdiff = −1 |
| 14 | 0 | 0 | 0 | 0 | 1 | 0 | 0 | 0 | 0 | 0 | rdiff = 0; gdiff = 4; bdiff = 0 |
| 15 | 0 | 0 | 0 | 0 | 1 | 0 | 0 | 0 | 0 | 1 | rdiff = 0; gdiff = 4; bdiff = 1 |
| 16 | 0 | 0 | 0 | 0 | 1 | 0 | 0 | 0 | 1 | 0 | rdiff = 0; gdiff = 4; bdiff = 2 |
| 17 | 0 | 0 | 1 | 1 | 1 | 0 | 0 | 1 | 1 | 0 | rdiff = 1; gdiff = −4; bdiff = −2 |
| 18 | 0 | 0 | 1 | 1 | 1 | 0 | 0 | 1 | 1 | 1 | rdiff = 1; gdiff = −4; bdiff = −1 |
| 19 | 0 | 0 | 1 | 1 | 1 | 0 | 0 | 0 | 0 | 0 | rdiff = 1; gdiff = −4; bdiff = 0 |
| 1A | 0 | 0 | 1 | 1 | 1 | 0 | 0 | 0 | 0 | 1 | rdiff = 1; gdiff = −4; bdiff = 1 |
| 1B | 0 | 0 | 1 | 1 | 1 | 0 | 0 | 0 | 1 | 0 | rdiff = 1; gdiff = −4; bdiff = 2 |
| 1C | 0 | 0 | 1 | 1 | 1 | 0 | 1 | 1 | 1 | 0 | rdiff = 1; gdiff = −3; bdiff = −2 |
| 1D | 0 | 0 | 1 | 1 | 1 | 0 | 1 | 1 | 1 | 1 | rdiff = 1; gdiff = −3; bdiff = −1 |
| 1E | 0 | 0 | 1 | 1 | 1 | 0 | 1 | 0 | 0 | 0 | rdiff = 1; gdiff = −3; bdiff = 0 |
| 1F | 0 | 0 | 1 | 1 | 1 | 0 | 1 | 0 | 0 | 1 | rdiff = 1; gdiff = −3; bdiff = 1 |
| 20 | 0 | 0 | 1 | 1 | 1 | 0 | 1 | 0 | 1 | 0 | rdiff = 1; gdiff = −3; bdiff = 2 |
| 21 | 0 | 0 | 1 | 1 | 1 | 1 | 0 | 1 | 1 | 0 | rdiff = 1; gdiff = −2; bdiff = −2 |
| 22 | 0 | 0 | 1 | 1 | 1 | 1 | 0 | 1 | 1 | 1 | rdiff = 1; gdiff = −2; bdiff = −1 |
| 23 | 0 | 0 | 1 | 1 | 1 | 1 | 0 | 0 | 0 | 0 | rdiff = 1; gdiff = −2; bdiff = 0 |
| 24 | 0 | 0 | 1 | 1 | 1 | 1 | 0 | 0 | 0 | 1 | rdiff = 1; gdiff = −2; bdiff = 1 |
| 25 | 0 | 0 | 1 | 1 | 1 | 1 | 0 | 0 | 1 | 0 | rdiff = 1; gdiff = −2; bdiff = 2 |
| 26 | 0 | 0 | 1 | 1 | 1 | 1 | 1 | 1 | 1 | 0 | rdiff = 1; gdiff = −1; bdiff = −2 |
| 27 | 0 | 0 | 1 | 1 | 1 | 1 | 1 | 1 | 1 | 1 | rdiff = 1; gdiff = −1; bdiff = −1 |
| 28 | 0 | 0 | 1 | 1 | 1 | 1 | 1 | 0 | 0 | 0 | rdiff = 1; gdiff = −1; bdiff = 0 |
| 29 | 0 | 0 | 1 | 1 | 1 | 1 | 1 | 0 | 0 | 1 | rdiff = 1; gdiff = −1; bdiff = 1 |
| 2A | 0 | 0 | 1 | 1 | 1 | 1 | 1 | 0 | 1 | 0 | rdiff = 1; gdiff = −1; bdiff = 2 |
| 2B | 0 | 0 | 1 | 0 | 0 | 0 | 0 | 1 | 1 | 0 | rdiff = 1; gdiff = 0; bdiff = −2 |
| 2C | 0 | 0 | 1 | 0 | 0 | 0 | 0 | 1 | 1 | 1 | rdiff = 1; gdiff = 0; bdiff = −1 |
| 2D | 0 | 0 | 1 | 0 | 0 | 0 | 0 | 0 | 0 | 0 | rdiff = 1; gdiff = 0; bdiff = 0 |
| 2E | 0 | 0 | 1 | 0 | 0 | 0 | 0 | 0 | 0 | 1 | rdiff = 1; gdiff = 0; bdiff = 1 |
| 2F | 0 | 0 | 1 | 0 | 0 | 0 | 0 | 0 | 1 | 0 | rdiff = 1; gdiff = 0; bdiff = 2 |

TABLE I-continued

| Address | Differences | | | | | | | | | | |
|---|---|---|---|---|---|---|---|---|---|---|---|
| | rdiff | | | gdiff | | | | bdiff | | | |
| (hex) | b9 | b8 | b7 | b6 | b5 | b4 | b3 | b2 | b1 | b0 | |
| 30 | 0 | 0 | 1 | 0 | 0 | 0 | 1 | 1 | 1 | 0 | rdiff = 1; gdiff = 1; bdiff = −2 |
| 31 | 0 | 0 | 1 | 0 | 0 | 0 | 1 | 1 | 1 | 1 | rdiff = 1; gdiff = 1; bdiff = −1 |
| 32 | 0 | 0 | 1 | 0 | 0 | 0 | 1 | 0 | 0 | 0 | rdiff = 1; gdiff = 1; bdiff = 0 |
| 33 | 0 | 0 | 1 | 0 | 0 | 0 | 1 | 0 | 0 | 1 | rdiff = 1; gdiff = 1; bdiff = 1 |
| 34 | 0 | 0 | 1 | 0 | 0 | 0 | 1 | 0 | 1 | 0 | rdiff = 1; gdiff = 1; bdiff = 2 |
| 35 | 0 | 0 | 1 | 0 | 0 | 1 | 0 | 1 | 1 | 0 | rdiff = 1; gdiff = 2; bdiff = −2 |
| 36 | 0 | 0 | 1 | 0 | 0 | 1 | 0 | 1 | 1 | 1 | rdiff = 1; gdiff = 2; bdiff = −1 |
| 37 | 0 | 0 | 1 | 0 | 0 | 1 | 0 | 0 | 0 | 0 | rdiff = 1; gdiff = 2; bdiff = 0 |
| 38 | 0 | 0 | 1 | 0 | 0 | 1 | 0 | 0 | 0 | 1 | rdiff = 1; gdiff = 2; bdiff = 1 |
| 39 | 0 | 0 | 1 | 0 | 0 | 1 | 0 | 0 | 1 | 0 | rdiff = 1; gdiff = 2; bdiff = 2 |
| 3A | 0 | 0 | 1 | 0 | 0 | 1 | 1 | 1 | 1 | 0 | rdiff = 1; gdiff = 3; bdiff = −2 |
| 3B | 0 | 0 | 1 | 0 | 0 | 1 | 1 | 1 | 1 | 1 | rdiff = 1; gdiff = 3; bdiff = −1 |
| 3C | 0 | 0 | 1 | 0 | 0 | 1 | 1 | 0 | 0 | 0 | rdiff = 1; gdiff = 3; bdiff = 0 |
| 3D | 0 | 0 | 1 | 0 | 0 | 1 | 1 | 0 | 0 | 1 | rdiff = 1; gdiff = 3; bdiff = 1 |
| 3E | 0 | 0 | 1 | 0 | 0 | 1 | 1 | 0 | 1 | 0 | rdiff = 1; gdiff = 3; bdiff = 2 |
| 3F | 0 | 0 | 1 | 0 | 1 | 0 | 0 | 1 | 1 | 0 | rdiff = 1; gdiff = 4; bdiff = −2 |
| 40 | 0 | 0 | 1 | 0 | 1 | 0 | 0 | 1 | 1 | 1 | rdiff = 1; gdiff = 4; bdiff = −1 |
| 41 | 0 | 0 | 1 | 0 | 1 | 0 | 0 | 0 | 0 | 0 | rdiff = 1; gdiff = 4; bdiff = 0 |
| 42 | 0 | 0 | 1 | 0 | 1 | 0 | 0 | 0 | 0 | 1 | rdiff = 1; gdiff = 4; bdiff = 1 |
| 43 | 0 | 0 | 1 | 0 | 1 | 0 | 0 | 0 | 1 | 0 | rdiff = 1; gdiff = 4; bdiff = 2 |
| 44 | 0 | 1 | 0 | 1 | 1 | 0 | 0 | 1 | 1 | 0 | rdiff = 2; gdiff = −4; bdiff = −2 |
| 45 | 0 | 1 | 0 | 1 | 1 | 0 | 0 | 1 | 1 | 1 | rdiff = 2; gdiff = −4; bdiff = −1 |
| 46 | 0 | 1 | 0 | 1 | 1 | 0 | 0 | 0 | 0 | 0 | rdiff = 2; gdiff = −4; bdiff = 0 |
| 47 | 0 | 1 | 0 | 1 | 1 | 0 | 0 | 0 | 0 | 1 | rdiff = 2; gdiff = −4; bdiff = 1 |
| 48 | 0 | 1 | 0 | 1 | 1 | 0 | 0 | 0 | 1 | 0 | rdiff = 2; gdiff = −4; bdiff = 2 |
| 49 | 0 | 1 | 0 | 1 | 1 | 0 | 1 | 1 | 1 | 0 | rdiff = 2; gdiff = −3; bdiff = −2 |
| 4A | 0 | 1 | 0 | 1 | 1 | 0 | 1 | 1 | 1 | 1 | rdiff = 2; gdiff = −3; bdiff = −1 |
| 4B | 0 | 1 | 0 | 1 | 1 | 0 | 1 | 0 | 0 | 0 | rdiff = 2; gdiff = −3; bdiff = 0 |
| 4C | 0 | 1 | 0 | 1 | 1 | 0 | 1 | 0 | 0 | 1 | rdiff = 2; gdiff = −3; bdiff = 1 |
| 4D | 0 | 1 | 0 | 1 | 1 | 0 | 1 | 0 | 1 | 0 | rdiff = 2; gdiff = −3; bdiff = 2 |
| 4E | 0 | 1 | 0 | 1 | 1 | 1 | 0 | 1 | 1 | 0 | rdiff = 2; gdiff = −2; bdiff = −2 |
| 4F | 0 | 1 | 0 | 1 | 1 | 1 | 0 | 1 | 1 | 1 | rdiff = 2; gdiff = −2; bdiff = −1 |
| 50 | 0 | 1 | 0 | 1 | 1 | 1 | 0 | 0 | 0 | 0 | rdiff = 2; gdiff = −2; bdiff = 0 |
| 51 | 0 | 1 | 0 | 1 | 1 | 1 | 0 | 0 | 0 | 1 | rdiff = 2; gdiff = −2; bdiff = 1 |
| 52 | 0 | 1 | 0 | 1 | 1 | 1 | 0 | 0 | 1 | 0 | rdiff = 2; gdiff = −2; bdiff = 2 |
| 53 | 0 | 1 | 0 | 1 | 1 | 1 | 1 | 1 | 1 | 0 | rdiff = 2; gdiff = −1; bdiff = −2 |
| 54 | 0 | 1 | 0 | 1 | 1 | 1 | 1 | 1 | 1 | 1 | rdiff = 2; gdiff = −1; bdiff = −1 |
| 55 | 0 | 1 | 0 | 1 | 1 | 1 | 1 | 0 | 0 | 0 | rdiff = 2; gdiff = −1; bdiff = 0 |
| 56 | 0 | 1 | 0 | 1 | 1 | 1 | 1 | 0 | 0 | 1 | rdiff = 2; gdiff = −1; bdiff = 1 |
| 57 | 0 | 1 | 0 | 1 | 1 | 1 | 1 | 0 | 1 | 0 | rdiff = 2; gdiff = −1; bdiff = 2 |
| 58 | 0 | 1 | 0 | 0 | 0 | 0 | 0 | 1 | 1 | 0 | rdiff = 2; gdiff = 0; bdiff = −2 |
| 59 | 0 | 1 | 0 | 0 | 0 | 0 | 0 | 1 | 1 | 1 | rdiff = 2; gdiff = 0; bdiff = −1 |
| 5A | 0 | 1 | 0 | 0 | 0 | 0 | 0 | 0 | 0 | 0 | rdiff = 2; gdiff = 0; bdiff = 0 |
| 5B | 0 | 1 | 0 | 0 | 0 | 0 | 0 | 0 | 0 | 1 | rdiff = 2; gdiff = 0; bdiff = 1 |
| 5C | 0 | 1 | 0 | 0 | 0 | 0 | 0 | 0 | 1 | 0 | rdiff = 2; gdiff = 0; bdiff = 2 |
| 5D | 0 | 1 | 0 | 0 | 0 | 0 | 1 | 1 | 1 | 0 | rdiff = 2; gdiff = 1; bdiff = −2 |
| 5E | 0 | 1 | 0 | 0 | 0 | 0 | 1 | 1 | 1 | 1 | rdiff = 2; gdiff = 1; bdiff = −1 |
| 5F | 0 | 1 | 0 | 0 | 0 | 0 | 1 | 0 | 0 | 0 | rdiff = 2; gdiff = 1; bdiff = 0 |
| 60 | 0 | 1 | 0 | 0 | 0 | 0 | 1 | 0 | 0 | 1 | rdiff = 2; gdiff = 1; bdiff = 1 |
| 61 | 0 | 1 | 0 | 0 | 0 | 0 | 1 | 0 | 1 | 0 | rdiff = 2; gdiff = 1; bdiff = 2 |
| 62 | 0 | 1 | 0 | 0 | 0 | 1 | 0 | 1 | 1 | 0 | rdiff = 2; gdiff = 2; bdiff = −2 |
| 63 | 0 | 1 | 0 | 0 | 0 | 1 | 0 | 1 | 1 | 1 | rdiff = 2; gdiff = 2; bdiff = −1 |
| 64 | 0 | 1 | 0 | 0 | 0 | 1 | 0 | 0 | 0 | 0 | rdiff = 2; gdiff = 2; bdiff = 0 |
| 65 | 0 | 1 | 0 | 0 | 0 | 1 | 0 | 0 | 0 | 1 | rdiff = 2; gdiff = 2; bdiff = 1 |
| 66 | 0 | 1 | 0 | 0 | 0 | 1 | 0 | 0 | 1 | 0 | rdiff = 2; gdiff = 2; bdiff = 2 |
| 67 | 0 | 1 | 0 | 0 | 0 | 1 | 1 | 1 | 1 | 0 | rdiff = 2; gdiff = 3; bdiff = −2 |
| 68 | 0 | 1 | 0 | 0 | 0 | 1 | 1 | 1 | 1 | 1 | rdiff = 2; gdiff = 3; bdiff = −1 |
| 69 | 0 | 1 | 0 | 0 | 0 | 1 | 1 | 0 | 0 | 0 | rdiff = 2; gdiff = 3; bdiff = 0 |
| 6A | 0 | 1 | 0 | 0 | 0 | 1 | 1 | 0 | 0 | 1 | rdiff = 2; gdiff = 3; bdiff = 1 |
| 6B | 0 | 1 | 0 | 0 | 0 | 1 | 1 | 0 | 1 | 0 | rdiff = 2; gdiff = 3; bdiff = 2 |
| 6C | 0 | 1 | 0 | 0 | 1 | 0 | 0 | 1 | 1 | 0 | rdiff = 2; gdiff = 4; bdiff = −2 |
| 6D | 0 | 1 | 0 | 0 | 1 | 0 | 0 | 1 | 1 | 1 | rdiff = 2; gdiff = 4; bdiff = −1 |
| 6E | 0 | 1 | 0 | 0 | 1 | 0 | 0 | 0 | 0 | 0 | rdiff = 2; gdiff = 4; bdiff = 0 |
| 6F | 0 | 1 | 0 | 0 | 1 | 0 | 0 | 0 | 0 | 1 | rdiff = 2; gdiff = 4; bdiff = 1 |
| 70 | 0 | 1 | 0 | 0 | 1 | 0 | 0 | 0 | 1 | 0 | rdiff = 2; gdiff = 4; bdiff = 2 |
| 71 | | | | | | | | | | | 1 uncompressed pixel follows |
| 72 | | | | | | | | | | | 2 uncompressed pixels follow |
| 73 | | | | | | | | | | | 3 uncompressed pixels follow |
| 74 | | | | | | | | | | | 4 uncompressed pixels follow |
| 75 | | | | | | | | | | | 5 uncompressed pixels follow |
| 76 | | | | | | | | | | | 6 uncompressed pixels follow |
| 77 | | | | | | | | | | | 7 uncompressed pixels follow |
| 78 | | | | | | | | | | | 8 uncompressed pixels follow |
| 79 | | | | | | | | | | | 9 uncompressed pixels follow |

TABLE I-continued

| Address | Differences | | | | | | | | | | |
|---|---|---|---|---|---|---|---|---|---|---|---|
| | rdiff | | | gdiff | | | | bdiff | | | |
| (hex) | b9 | b8 | b7 | b6 | b5 | b4 | b3 | b2 | b1 | b0 | |
| 7A | | | | | | | | | | | 10 uncompressed pixels follow |
| 7B | | | | | | | | | | | 11 uncompressed pixels follow |
| 1C | | | | | | | | | | | 12 uncompressed pixels follow |
| 7D | | | | | | | | | | | 13 uncompressed pixels follow |
| 7E | | | | | | | | | | | 14 uncompressed pixels follow |
| 7F | | | | | | | | | | | 15 uncompressed pixels follow |
| 80 | | | | | | | | | | | No Operation |
| 81 | | | | | | | | | | | 1 repetition of last pixel |
| 82 | | | | | | | | | | | 2 repetitions of last pixel |
| 83 | | | | | | | | | | | 3 repetitions of last pixel |
| 84 | | | | | | | | | | | 4 repetitions of last pixel |
| 85 | | | | | | | | | | | 5 repetitions of last pixel |
| 86 | | | | | | | | | | | 6 repetitions of last pixel |
| 87 | | | | | | | | | | | 7 repetitions of last pixel |
| 88 | | | | | | | | | | | 8 repetitions of last pixel |
| 89 | | | | | | | | | | | 9 repetitions of last pixel |
| 8A | | | | | | | | | | | 10 repetitions of last pixel |
| 8B | | | | | | | | | | | 11 repetitions of last pixel |
| 8C | | | | | | | | | | | 12 repetitions of last pixel |
| 8D | | | | | | | | | | | 13 repetitions of last pixel |
| 8E | | | | | | | | | | | 14 repetitions of last pixel |
| 8F | | | | | | | | | | | 15 repetitions of last pixel |
| 90 | 1 | 1 | 0 | 1 | 1 | 0 | 0 | 1 | 1 | 0 | rdiff = −2; gdiff = −4; bdiff = −2 |
| 91 | 1 | 1 | 0 | 1 | 1 | 0 | 0 | 1 | 1 | 1 | rdiff = −2; gdiff = −4; bdiff = −1 |
| 92 | 1 | 1 | 0 | 1 | 1 | 0 | 0 | 0 | 0 | 0 | rdiff = −2; gdiff = −4; bdiff = 0 |
| 93 | 1 | 1 | 0 | 1 | 1 | 0 | 0 | 0 | 0 | 1 | rdiff = −2; gdiff = −4; bdiff = 1 |
| 94 | 1 | 1 | 0 | 1 | 1 | 0 | 0 | 0 | 1 | 0 | rdiff = −2; gdiff = −4; bdiff = 2 |
| 95 | 1 | 1 | 0 | 1 | 1 | 0 | 1 | 1 | 1 | 0 | rdiff = −2; gdiff = −3; bdiff = −2 |
| 96 | 1 | 1 | 0 | 1 | 1 | 0 | 1 | 1 | 1 | 1 | rdiff = −2; gdiff = −3; bdiff = −1 |
| 97 | 1 | 1 | 0 | 1 | 1 | 0 | 1 | 0 | 0 | 0 | rdiff = −2; gdiff = −3; bdiff = 0 |
| 98 | 1 | 1 | 0 | 1 | 1 | 0 | 1 | 0 | 0 | 1 | rdiff = −2; gdiff = −3; bdiff = 1 |
| 99 | 1 | 1 | 0 | 1 | 1 | 0 | 1 | 0 | 1 | 0 | rdiff = −2; gdiff = −3; bdiff = 2 |
| 9A | 1 | 1 | 0 | 1 | 1 | 1 | 0 | 1 | 1 | 0 | rdiff = −2; gdiff = −2; bdiff = −2 |
| 9B | 1 | 1 | 0 | 1 | 1 | 1 | 0 | 1 | 1 | 1 | rdiff = −2; gdiff = −2; bdiff = −1 |
| 9C | 1 | 1 | 0 | 1 | 1 | 1 | 0 | 0 | 0 | 0 | rdiff = −2; gdiff = −2; bdiff = 0 |
| 9D | 1 | 1 | 0 | 1 | 1 | 1 | 0 | 0 | 0 | 1 | rdiff = −2; gdiff = −2; bdiff = 1 |
| 9E | 1 | 1 | 0 | 1 | 1 | 1 | 0 | 0 | 1 | 0 | rdiff = −2; gdiff = −2; bdiff = 2 |
| 9F | 1 | 1 | 0 | 1 | 1 | 1 | 1 | 1 | 1 | 0 | rdiff = −2; gdiff = −1; bdiff = −2 |
| A0 | 1 | 1 | 0 | 1 | 1 | 1 | 1 | 1 | 1 | 1 | rdiff = −2; gdiff = −1; bdiff = −1 |
| A1 | 1 | 1 | 0 | 1 | 1 | 1 | 1 | 0 | 0 | 0 | rdiff = −2; gdiff = −1; bdiff = 0 |
| A2 | 1 | 1 | 0 | 1 | 1 | 1 | 1 | 0 | 0 | 1 | rdiff = −2; gdiff = −1; bdiff = 1 |
| A3 | 1 | 1 | 0 | 1 | 1 | 1 | 1 | 0 | 1 | 0 | rdiff = −2; gdiff = −1; bdiff = 2 |
| A4 | 1 | 1 | 0 | 0 | 0 | 0 | 0 | 1 | 1 | 0 | rdiff = −2; gdiff = 0; bdiff = −2 |
| A5 | 1 | 1 | 0 | 0 | 0 | 0 | 0 | 1 | 1 | 1 | rdiff = −2; gdiff = 0; bdiff = −1 |
| A6 | 1 | 1 | 0 | 0 | 0 | 0 | 0 | 0 | 0 | 0 | rdiff = −2; gdiff = 0; bdiff = 0 |
| A7 | 1 | 1 | 0 | 0 | 0 | 0 | 0 | 0 | 0 | 1 | rdiff = −2; gdiff = 0; bdiff = 1 |
| A8 | 1 | 1 | 0 | 0 | 0 | 0 | 0 | 0 | 1 | 0 | rdiff = −2; gdiff = 0; bdiff = 2 |
| A9 | 1 | 1 | 0 | 0 | 0 | 0 | 1 | 1 | 1 | 0 | rdiff = −2; gdiff = 1; bdiff = −2 |
| AA | 1 | 1 | 0 | 0 | 0 | 0 | 1 | 1 | 1 | 1 | rdiff = −2; gdiff = 1; bdiff = −1 |
| AB | 1 | 1 | 0 | 0 | 0 | 0 | 1 | 0 | 0 | 0 | rdiff = −2; gdiff = 1; bdiff = 0 |
| AC | 1 | 1 | 0 | 0 | 0 | 0 | 1 | 0 | 0 | 1 | rdiff = −2; gdiff = 1; bdiff = 1 |
| AD | 1 | 1 | 0 | 0 | 0 | 0 | 1 | 0 | 1 | 0 | rdiff = −2; gdiff = 1; bdiff = 2 |
| AE | 1 | 1 | 0 | 0 | 0 | 1 | 0 | 1 | 1 | 0 | rdiff = −2; gdiff = 2; bdiff = −2 |
| AF | 1 | 1 | 0 | 0 | 0 | 1 | 0 | 1 | 1 | 1 | rdiff = −2; gdiff = 2; bdiff = −1 |
| B0 | 1 | 1 | 0 | 0 | 0 | 1 | 0 | 0 | 0 | 0 | rdiff = −2; gdiff = 2; bdiff = 0 |
| B1 | 1 | 1 | 0 | 0 | 0 | 1 | 0 | 0 | 0 | 1 | rdiff = −2; gdiff = 2; bdiff = 1 |
| B2 | 1 | 1 | 0 | 0 | 0 | 1 | 0 | 0 | 1 | 0 | rdiff = −2; gdiff = 2; bdiff = 2 |
| B3 | 1 | 1 | 0 | 0 | 0 | 1 | 1 | 1 | 1 | 0 | rdiff = −2; gdiff = 3; bdiff = −2 |
| B4 | 1 | 1 | 0 | 0 | 0 | 1 | 1 | 1 | 1 | 1 | rdiff = −2; gdiff = 3; bdiff = −1 |
| B5 | 1 | 1 | 0 | 0 | 0 | 1 | 1 | 0 | 0 | 0 | rdiff = −2; gdiff = 3; bdiff = 0 |
| B6 | 1 | 1 | 0 | 0 | 0 | 1 | 1 | 0 | 0 | 1 | rdiff = −2; gdiff = 3; bdiff = 1 |
| B7 | 1 | 1 | 0 | 0 | 0 | 1 | 1 | 0 | 1 | 0 | rdiff = −2; gdiff = 3; bdiff = 2 |
| B8 | 1 | 1 | 0 | 0 | 1 | 0 | 0 | 1 | 1 | 0 | rdiff = −2; gdiff = 4; bdiff = −2 |
| B9 | 1 | 1 | 0 | 0 | 1 | 0 | 0 | 1 | 1 | 1 | rdiff = −2; gdiff = 4; bdiff = −1 |
| BA | 1 | 1 | 0 | 0 | 1 | 0 | 0 | 0 | 0 | 0 | rdiff = −2; gdiff = 4; bdiff = 0 |
| BB | 1 | 1 | 0 | 0 | 1 | 0 | 0 | 0 | 0 | 1 | rdiff = −2; gdiff = 4; bdiff = 1 |
| BC | 1 | 1 | 0 | 0 | 1 | 0 | 0 | 0 | 1 | 0 | rdiff = −2; gdiff = 4; bdiff = 2 |
| BD | 1 | 1 | 1 | 1 | 1 | 0 | 0 | 1 | 1 | 0 | rdiff = −1; gdiff = −4; bdiff = −2 |
| BE | 1 | 1 | 1 | 1 | 1 | 0 | 0 | 1 | 1 | 1 | rdiff = −1; gdiff = −4; bdiff = −1 |
| BF | 1 | 1 | 1 | 1 | 1 | 0 | 0 | 0 | 0 | 0 | rdiff = −1; gdiff = −4; bdiff = 0 |
| C0 | 1 | 1 | 1 | 1 | 1 | 0 | 0 | 0 | 0 | 1 | rdiff = −1; gdiff = −4; bdiff = 1 |
| C1 | 1 | 1 | 1 | 1 | 1 | 0 | 0 | 0 | 1 | 0 | rdiff = −1; gdiff = −4; bdiff = 2 |

TABLE I-continued

| Address | Differences | | | | | | | | | | |
|---|---|---|---|---|---|---|---|---|---|---|---|
| | rdiff | | | gdiff | | | | bdiff | | | |
| (hex) | b9 | b8 | b7 | b6 | b5 | b4 | b3 | b2 | b1 | b0 | |
| C2 | 1 | 1 | 1 | 1 | 1 | 0 | 1 | 1 | 1 | 0 | rdiff = −1; gdiff = −3; bdiff = −2 |
| C3 | 1 | 1 | 1 | 1 | 1 | 0 | 1 | 1 | 1 | 1 | rdiff = −1; gdiff = −3; bdiff = −1 |
| C4 | 1 | 1 | 1 | 1 | 1 | 0 | 1 | 0 | 0 | 0 | rdiff = −1; gdiff = −3; bdiff = 0 |
| C5 | 1 | 1 | 1 | 1 | 1 | 0 | 1 | 0 | 0 | 1 | rdiff = −1; gdiff = −3; bdiff = 1 |
| C6 | 1 | 1 | 1 | 1 | 1 | 0 | 1 | 0 | 1 | 0 | rdiff = −1; gdiff = −3; bdiff = 2 |
| C7 | 1 | 1 | 1 | 1 | 1 | 1 | 0 | 1 | 1 | 0 | rdiff = −1; gdiff = −2; bdiff = −2 |
| C8 | 1 | 1 | 1 | 1 | 1 | 1 | 0 | 1 | 1 | 1 | rdiff = −1; gdiff = −2; bdiff = −1 |
| C9 | 1 | 1 | 1 | 1 | 1 | 1 | 0 | 0 | 0 | 0 | rdiff = −1; gdiff = −2; bdiff = 0 |
| CA | 1 | 1 | 1 | 1 | 1 | 1 | 0 | 0 | 0 | 1 | rdiff = −1; gdiff = −2; bdiff = 1 |
| CB | 1 | 1 | 1 | 1 | 1 | 1 | 0 | 0 | 1 | 0 | rdiff = −1; gdiff = −2; bdiff = 2 |
| CC | 1 | 1 | 1 | 1 | 1 | 1 | 1 | 1 | 1 | 0 | rdiff = −1; gdiff = −1; bdiff = −2 |
| CD | 1 | 1 | 1 | 1 | 1 | 1 | 1 | 1 | 1 | 1 | rdiff = −1; gdiff = −1; bdiff = −1 |
| CE | 1 | 1 | 1 | 1 | 1 | 1 | 1 | 0 | 0 | 0 | rdiff = −1; gdiff = −1; bdiff = 0 |
| CF | 1 | 1 | 1 | 1 | 1 | 1 | 1 | 0 | 0 | 1 | rdiff = −1; gdiff = −1; bdiff = 1 |
| D0 | 1 | 1 | 1 | 1 | 1 | 1 | 1 | 0 | 1 | 0 | rdiff = −1; gdiff = −1; bdiff = 2 |
| D1 | 1 | 1 | 1 | 0 | 0 | 0 | 0 | 1 | 1 | 0 | rdiff = −1; gdiff = 0; bdiff = −2 |
| D2 | 1 | 1 | 1 | 0 | 0 | 0 | 0 | 1 | 1 | 1 | rdiff = −1; gdiff = 0; bdiff = −1 |
| D3 | 1 | 1 | 1 | 0 | 0 | 0 | 0 | 0 | 0 | 0 | rdiff = −1; gdiff = 0; bdiff = 0 |
| D4 | 1 | 1 | 1 | 0 | 0 | 0 | 0 | 0 | 0 | 1 | rdiff = −1; gdiff = 0; bdiff = 1 |
| D5 | 1 | 1 | 1 | 0 | 0 | 0 | 0 | 0 | 1 | 0 | rdiff = −1; gdiff = 0; bdiff = 2 |
| D6 | 1 | 1 | 1 | 0 | 0 | 0 | 1 | 1 | 1 | 0 | rdiff = −1; gdiff = 1; bdiff = −2 |
| D7 | 1 | 1 | 1 | 0 | 0 | 0 | 1 | 1 | 1 | 1 | rdiff = −1; gdiff = 1; bdiff = −1 |
| D8 | 1 | 1 | 1 | 0 | 0 | 0 | 1 | 0 | 0 | 0 | rdiff = −1; gdiff = 1; bdiff = 0 |
| D9 | 1 | 1 | 1 | 0 | 0 | 0 | 1 | 0 | 0 | 1 | rdiff = −1; gdiff = 1; bdiff = 1 |
| DA | 1 | 1 | 1 | 0 | 0 | 0 | 1 | 0 | 1 | 0 | rdiff = −1; gdiff = 1; bdiff = 2 |
| DB | 1 | 1 | 1 | 0 | 0 | 1 | 0 | 1 | 1 | 0 | rdiff = −1; gdiff = 2; bdiff = −2 |
| DC | 1 | 1 | 1 | 0 | 0 | 1 | 0 | 1 | 1 | 1 | rdiff = −1; gdiff = 2; bdiff = −1 |
| DD | 1 | 1 | 1 | 0 | 0 | 1 | 0 | 0 | 0 | 0 | rdiff = −1; gdiff = 2; bdiff = 0 |
| DE | 1 | 1 | 1 | 0 | 0 | 1 | 0 | 0 | 0 | 1 | rdiff = −1; gdiff = 2; bdiff = 1 |
| DF | 1 | 1 | 1 | 0 | 0 | 1 | 0 | 0 | 1 | 0 | rdiff = −1; gdiff = 2; bdiff = 2 |
| E0 | 1 | 1 | 1 | 0 | 0 | 1 | 1 | 1 | 1 | 0 | rdiff = −1; gdiff = 3; bdiff = −2 |
| E1 | 1 | 1 | 1 | 0 | 0 | 1 | 1 | 1 | 1 | 1 | rdiff = −1; gdiff = 3; bdiff = −1 |
| E2 | 1 | 1 | 1 | 0 | 0 | 1 | 1 | 0 | 0 | 0 | rdiff = −1; gdiff = 3; bdiff = 0 |
| E3 | 1 | 1 | 1 | 0 | 0 | 1 | 1 | 0 | 0 | 1 | rdiff = −1; gdiff = 3; bdiff = 1 |
| E4 | 1 | 1 | 1 | 0 | 0 | 1 | 1 | 0 | 1 | 0 | rdiff = −1; gdiff = 3; bdiff = 2 |
| E5 | 1 | 1 | 1 | 0 | 1 | 0 | 0 | 1 | 1 | 0 | rdiff = −1; gdiff = 4; bdiff = −2 |
| E6 | 1 | 1 | 1 | 0 | 1 | 0 | 0 | 1 | 1 | 1 | rdiff = −1; gdiff = 4; bdiff = −1 |
| E7 | 1 | 1 | 1 | 0 | 1 | 0 | 0 | 0 | 0 | 0 | rdiff = −1; gdiff = 4; bdiff = 0 |
| E8 | 1 | 1 | 1 | 0 | 1 | 0 | 0 | 0 | 0 | 1 | rdiff = −1; gdiff = 4; bdiff = 1 |
| E9 | 1 | 1 | 1 | 0 | 1 | 0 | 0 | 0 | 1 | 0 | rdiff = −1; gdiff = 4; bdiff = 2 |
| EA | 0 | 0 | 0 | 1 | 1 | 0 | 0 | 1 | 1 | 0 | rdiff = 0; gdiff = −4; bdiff = −2 |
| EB | 0 | 0 | 0 | 1 | 1 | 0 | 0 | 1 | 1 | 1 | rdiff = 0; gdiff = −4; bdiff = −1 |
| EC | 0 | 0 | 0 | 1 | 1 | 0 | 0 | 0 | 0 | 0 | rdiff = 0; gdiff = −4; bdiff = 0 |
| ED | 0 | 0 | 0 | 1 | 1 | 0 | 0 | 0 | 0 | 1 | rdiff = 0; gdiff = −4; bdiff = 1 |
| EE | 0 | 0 | 0 | 1 | 1 | 0 | 0 | 0 | 1 | 0 | rdiff = 0; gdiff = −4; bdiff = 2 |
| EF | 0 | 0 | 0 | 1 | 1 | 0 | 1 | 1 | 1 | 0 | rdiff = 0; gdiff = −3; bdiff = −2 |
| F0 | 0 | 0 | 0 | 1 | 1 | 0 | 1 | 1 | 1 | 1 | rdiff = 0; gdiff = −3; bdiff = −1 |
| F1 | 0 | 0 | 0 | 1 | 1 | 0 | 1 | 0 | 0 | 0 | rdiff = 0; gdiff = −3; bdiff = 0 |
| F2 | 0 | 0 | 0 | 1 | 1 | 0 | 1 | 0 | 0 | 1 | rdiff = 0; gdiff = −3; bdiff = 1 |
| F3 | 0 | 0 | 0 | 1 | 1 | 0 | 1 | 0 | 1 | 0 | rdiff = 0; gdiff = −3; bdiff = 2 |
| F4 | 0 | 0 | 0 | 1 | 1 | 1 | 0 | 1 | 1 | 0 | rdiff = 0; gdiff = −2; bdiff = −2 |
| F5 | 0 | 0 | 0 | 1 | 1 | 1 | 0 | 1 | 1 | 1 | rdiff = 0; gdiff = −2; bdiff = −1 |
| F6 | 0 | 0 | 0 | 1 | 1 | 1 | 0 | 0 | 0 | 0 | rdiff = 0; gdiff = −2; bdiff = 0 |
| F7 | 0 | 0 | 0 | 1 | 1 | 1 | 0 | 0 | 0 | 1 | rdiff = 0; gdiff = −2; bdiff = 1 |
| F8 | 0 | 0 | 0 | 1 | 1 | 1 | 0 | 0 | 1 | 0 | rdiff = 0; gdiff = −2; bdiff = 2 |
| F9 | 0 | 0 | 0 | 1 | 1 | 1 | 1 | 1 | 1 | 0 | rdiff = 0; gdiff = −1; bdiff = −2 |
| FA | 0 | 0 | 0 | 1 | 1 | 1 | 1 | 1 | 1 | 1 | rdiff = 0; gdiff = −1; bdiff = −1 |
| FB | 0 | 0 | 0 | 1 | 1 | 1 | 1 | 0 | 0 | 0 | rdiff = 0; gdiff = −1; bdiff = 0 |
| FC | 0 | 0 | 0 | 1 | 1 | 1 | 1 | 0 | 0 | 1 | rdiff = 0; gdiff = −1; bdiff = 1 |
| FD | 0 | 0 | 0 | 1 | 1 | 1 | 1 | 0 | 1 | 0 | rdiff = 0; gdiff = −1; bdiff = 2 |
| FE | 0 | 0 | 0 | 0 | 0 | 0 | 0 | 1 | 1 | 0 | rdiff = 0; gdiff = 0; bdiff = −2 |
| FF | 0 | 0 | 0 | 0 | 0 | 0 | 0 | 1 | 1 | 1 | rdiff = 0; gdiff = 0; bdiff = −1 |

The farther (optional) compression, exploiting e.g. data repetition, can be part of the compression algorithm initiated by ServiceRepaints( . . . ), or it can be performed later, as the second transformation process described below, or as a part of that process. Performing it later has the advantage that this compression time does not add to the response time, i.e. the time from an operator action to a visible change on the screen.

Figure 6:
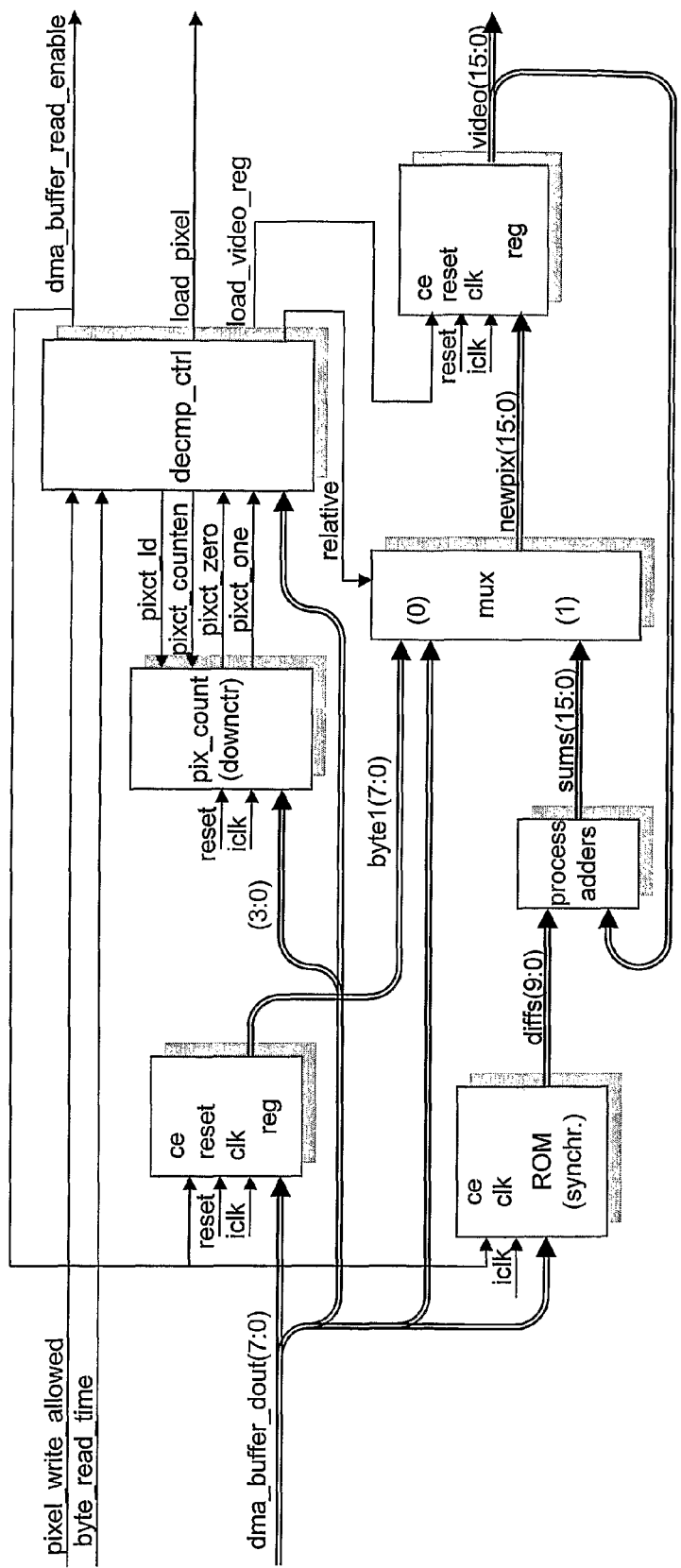
FIG. 6 is a schematic diagram showing an example of the central part of the decompression logic of FIG. 5 in more detail.
Figures 1, 7:
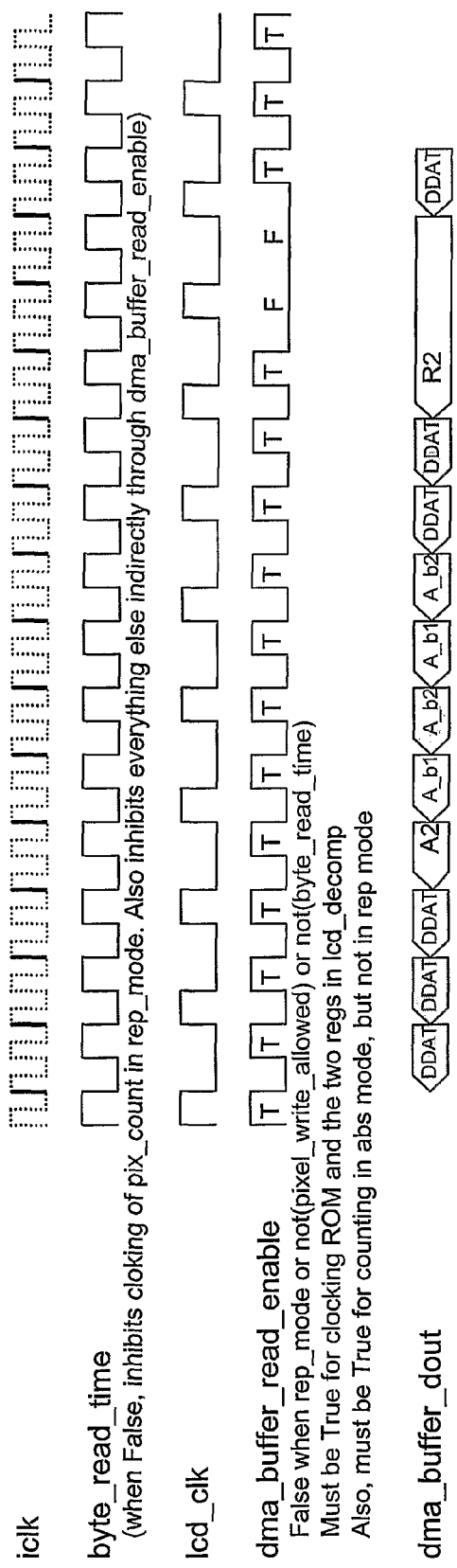
FIG. 7 shows an example of the timing of the exemplary decompression logic.
Figures 2, 7:
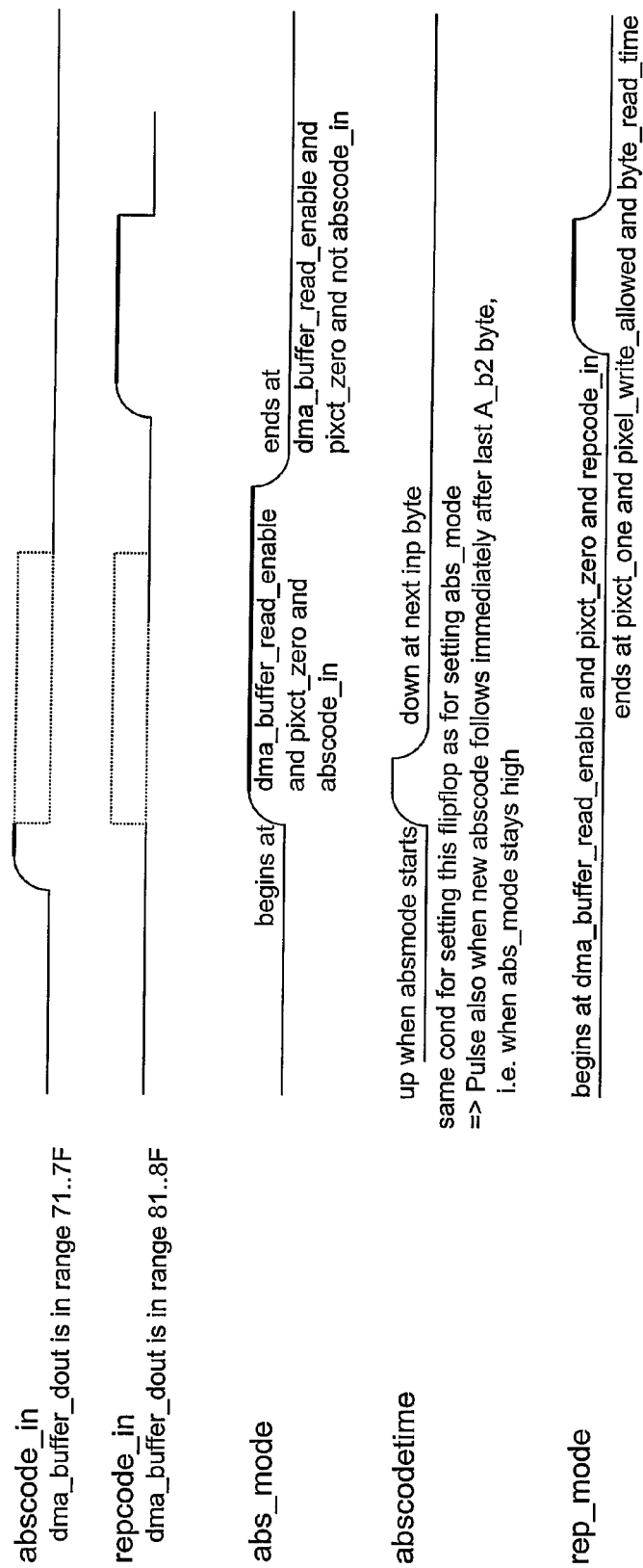
Figures 3, 7:
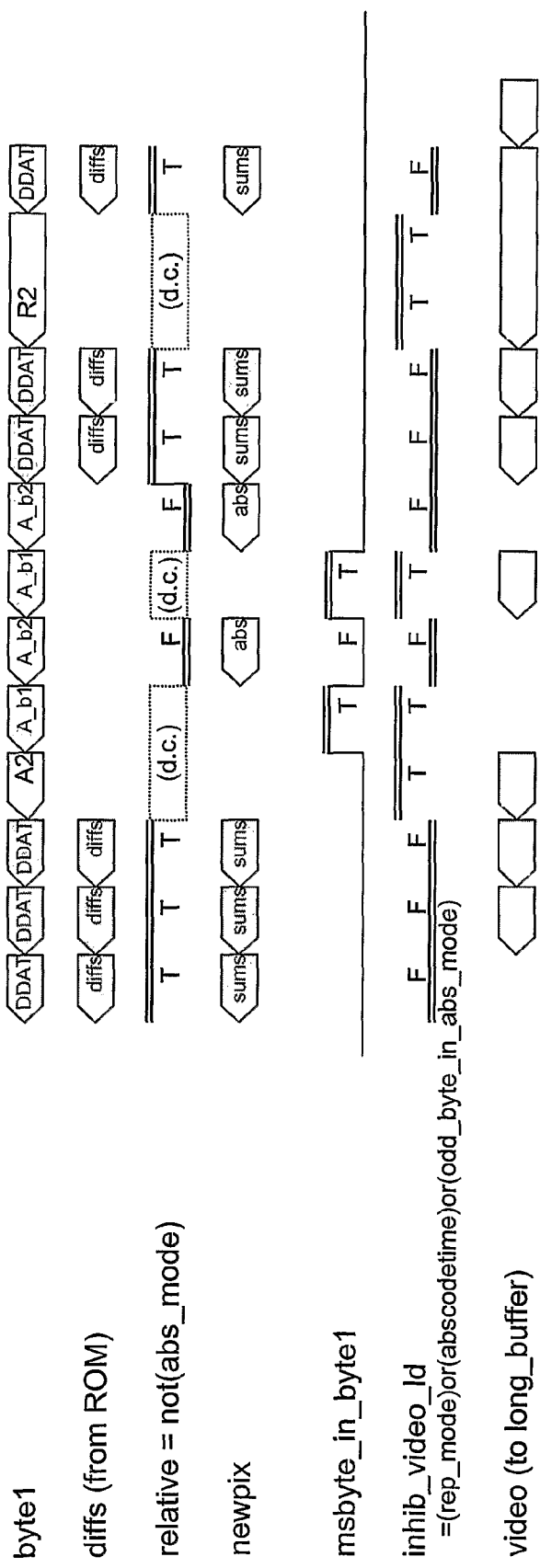
Figures 4, 7:
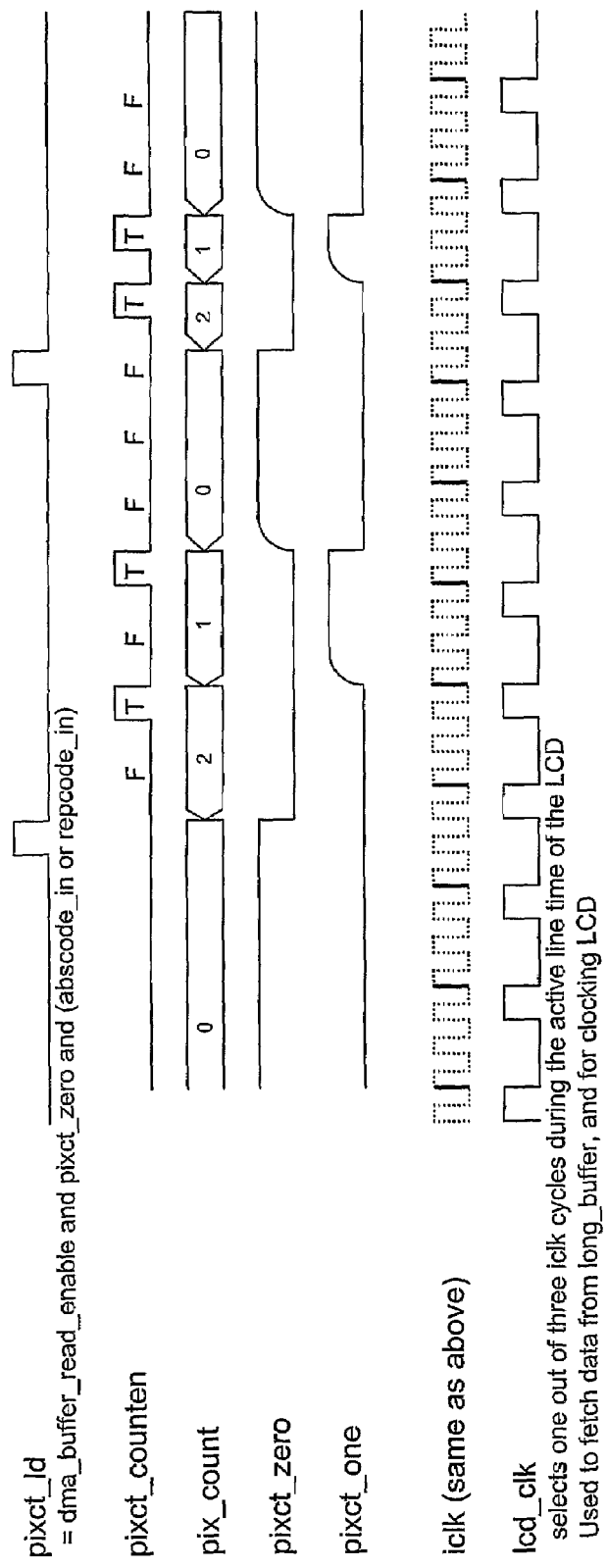

FIG. 6 is a schematic diagram showing an example of the central part of the logic of FIG. 5 in somewhat more detail, whereas FIG. 7 shows an example of the timing of the decompression logic.

The primary image area (image1) may as an example contain 640×480 pixels in sequence, i.e. each line is a string of 640×2 bytes and is immediately followed by the next line. The graphics routines draw the image in this area.

ServiceRepaints( ) should do a transformation of a rectangular sub-image, containing changes, from the primary to the secondary image area (image2). Usually the sub-image will be only a small part of the full screen. Scan lines above and below the sub-image have not changed and should not be compressed again. The width of the sub-image to be recompressed will depend on the locations of the leftmost and rightmost changed pixels. Each line (e.g. 640 pixels) is considered to have e.g. five equal parts, or segments, of 128 pixels, i.e. 256 bytes, starting at 0, 256, 512, 768, and 1024 byte locations from the start of the line in image1. The fill image is thus divided into five 128 pixels wide vertical stripes. Such stripes that are entirely to the left or to the right of the rectangle known to contain all the changed pixels will, in order to save time, not be included in the sub-image to be compressed.

Thus, if ServiceRepaints( . . . ) specifies the x/y limits of the smallest rectangle that contains all the changed pixels, then the sub-image should use the limits in the y direction, but the limits in the x direction should be adjusted. The byte address for the leftmost edge should be truncated: its 8 least significant bits should be set to 0. The rightmost edge should be truncated in the same way, but also increased by 256.

The transformation of a sub-image from image1 to image2 involves the microcoded compression; the fast algorithm that guarantees compression down to 75% size at most. Each one of the 5×480=2400 line segments has its fixed address in image2 as well as in image1. In image2 they could be placed on 192 byte intervals instead of 256 as in image1, since we know that 192 bytes will be their maximum size after compression. However, the difference is only 15% of a megabyte, and it is simpler for the microcode to use 256 byte intervals also in image2. That will also allow for the insertion of a byte giving the length of the segment; that byte should be placed in a fixed position in the segment data; in the preferred embodiment it has been placed in the beginning. The compressed data to be transferred to the DMA channel starts immediately after. The segment data to be transferred must be an even number of bytes; thus the compression algorithm must allow for a padding byte to insert at the end in case the segment data would otherwise be an odd number of bytes. Note also that the first data on each line segment should be independent on the end of the previous line segment—i.e. it should contain absolute values—and that the end (or the beginning) of a segment should somehow (in the coding) signal this to the receiving decoder hardware.

If the transfer from the compressed image area of the main memory to the decompression logic is performed by DMA, it may be desirable to integrate the DMA unit within the microcode-controlled processor, preferably implementing the direct memory access process by means of a special sequence of microcode words in the internal micro program memory.

The DMA process is here preferably controlled by pointers and counters in certain locations in main memory. A display refresh micro program handles the data transfer from image2 to the I/O buffer memory in the processor. This microcode uses the segment length byte in the segment head to skip over the unused space at the end of segment data. Any special codes and padding should, however, already be there in image2, so that the DMA micro program can be as efficient as possible.

The FPGA includes the logic needed for producing the absolute video data values. This includes a table lookup for the 5×9×5=225 small-difference code bytes plus some additional counter and decoding logic and some adders.

When a transformation following an image update (ServiceRepaints or similar) has been completed, the video displayed on the screen will be the updated image, but usually is not as well compressed as possible.

A second transformation process can now be performed when there is time for it.

The purpose of the first transformation is to bring down the data flow to a maximum of 75% in order to allow 40 Hz instead of 30. The purpose of the second transformation is to reduce the data flow further, in order to give the processor more time for program execution. This process will select a segment to work on, compress its data further, writing the result into the scratchpad memory in the processor. When it reaches the end of segment data in image2, it will overwrite this segment data with the (normally shorter) result contained in the scratchpad, complete with an updated length byte. This process can be initiated after every update. A table in memory shows the status for each line segment in image2. There the process will look for segments that it has not yet processed, and then it will process those, and go to sleep when there are no more segments left to process. An update should make the appropriate changes in this table. As an alternative, the table could be replaced by a status byte in each segment head in image2.

A third step, if this were considered of value for the specific application, would eliminate any flashes of partially painted objects in the displayed image. We have seen that there will be no partially painted line segments, but it is often desired that e.g. partially changed text lines or other graphics objects are never displayed, even for a single frame. When the object first appears, it must be complete, it must not be cut in half.

This feature is in advanced systems accomplished by double buffering, i.e. the transformation is targeting a buffer area which is not in use for display refresh, and when the image in this area is complete, and the display process has finished a frame, the display refresh process is switched over to using this buffer. Then the new image must be copied to the "old" display area, which will then become the target area for new image changes. The new special method described above can, however, without much further work be developed into giving the same advantage of synchronized image update without the disadvantage of having to copy the unchanged parts of the image. Only a development of the status information and some change to the micro program is needed, plus some additional memory space, a third area of the same size as image1 and image2. This area, image3, is equivalent to image2; it has a 256-byte slot for each segment. Thus, each segment in the uncompressed image1 has a corresponding slot for its compressed version in each of image2 and image3. Which one of these is used for refresh is controlled by one bit, which could be held in a table but in the preferred embodiment resides in the status information for (in) the preceding compressed segment, i.e. the one that precedes it in time in the refresh process. The one that is not used is free and will be used for new data. The compressed segments are linked into a chain by this new control bit. When the refresh process has output the compressed video data for one segment, this bit will control which of the possible sources (image2 or image3) should be used for the next segment. When a segment is compressed, the result is written in the slot that is not used. When all segments corresponding to one ServiceRepaint( ) have been compressed, the new linking is performed (without interruption by the presentation), i.e. the control bits are changed such that the new compressed versions are used for refresh, while the link chain is unchanged in those parts corresponding to unchanged areas of the image. If the update of the linking is performed from the end towards the beginning of the chain, no disruption of the image will occur.

More generally, to eliminate any flashes of partially painted objects in the displayed image, it may be desirable to double-buffer selected line segments of the compressed image area. For each pair of double-buffered line segments, the compression process may target the line segment not in use for display refresh and the refresh process may target the other line segment, and each pair of double-buffered line segment can be associated with a control code controlling which of the line segments is to be used for refresh and which can be used for storing new compressed image data. When the line segments, with associated control codes, are properly linked, no disruption of the image will occur. This means that only after all line segments corresponding to a sub-image containing changes have been compressed the associated control codes will be changed such that the new compressed line segment versions are used for refresh.

The embodiments described above are merely given as examples, and it should be understood that the present invention is not limited thereto. Further modifications, changes and improvements, which retain the basic underlying principles disclosed, are within the scope of the invention.

The invention claimed is:

1. A method for updating and refreshing an image in an image display system having a processor configured as a central processing unit (CPU), a main memory associated with the processor, and a display, the CPU being a microcode-controlled processor having a CPU-internal micro program memory for storing microcode words and execution circuitry for executing the microcode words, the CPU-internal micro program memory comprising microcode words for controlling an internal operation of the CPU, and a special sequence of microcode words for performing compression, the method comprising:
    storing image data relating to the image in an uncompressed image area of said main memory of the processor, the uncompressed image area being divided into segments; performing compression according to a first transformation process to ensure a specific level of compression by executing, after changes have been made in the uncompressed image area, said special sequence of microcode words in said CPU-internal micro program memory, for reading and compressing segments of the uncompressed image area that are subject to said changes, each segment able to be independently compressed and decompressed;
    performing further compression, when there is available processing time, according to a second transformation process to improve the compression level by selecting one or more segments to work on and further compress the data;
    storing the compressed segments of the image data in a compressed image area of the main memory of the processor, each segment having a dedicated space;
    fetching compressed image data from the compressed image area;
    decompressing the compressed image data fetched from the compressed image area, and generating an appropriate image signal based on the compressed image area; and
    applying the generated image signal to said display to refresh said image,
    wherein the processor enables refreshing of the image only with the compressed image data in the main memory of the processor.

2. The method of claim 1, wherein said special sequence of microcode words is adapted for allowing changes of a limited part of the image contents without having to recompress the entire image.

3. The method of claim 1, wherein said special sequence of microcode words is adapted for performing compression on a rectangular area of said image corresponding to the smallest rectangle containing said changes.

4. The method of claim 3, wherein said rectangular area of said image has a number of line segments, which when compressed by said special sequence of microcode words are written one at a time without interruption into the compressed image area of the main memory.

5. The method of claim 4, wherein each line segment can be compressed and decompressed independently of all other line segments in said rectangular area.

6. The method of claim 1, wherein said special sequence of microcode words causes writing the compressed parts of the image into said compressed image area of the main memory of the processor in a way that ensures that only complete image objects are output to the compressed image area.

7. The method of claim 1, wherein said special sequence of microcode words is a part of the microcode words in the micro program memory that is triggered as and when needed for compressing at least parts of the uncompressed image area that are subject to said changes, and compressed image data is fetched from the compressed image area in phase with the refresh scanning of the display.

8. The method of claim 1, wherein the microcode-implemented compressing is executed time-shared with ordinary control operations of the microcode-controlled processor.

9. The method of claim 1, wherein an application program, running from the main memory, performs changes in the image in the uncompressed image area and calls a routine for making the changes visible on the display, wherein said routine initiates said special sequence of microcode words stored in the micro program memory.

10. The method of claim 1, wherein said first transformation process is based on color difference coding and said second transformation process is based on data repetition coding.

11. The method of claim 1, wherein selected line segments of the compressed image area are double buffered, and for each pair of double-buffered line segments, the compression process may target the line segment not in use for display refresh and the refresh process may target the other line segment,
    each pair of double-buffered line segment is associated with a control code controlling which of the line segments is to be used for refresh and which can be used for storing new compressed image data,
    the method further comprising changing, when all line segments corresponding to a sub-image containing changes have been compressed, associated control codes such that the new compressed line segments are used for refresh.

12. The method of claim 11, wherein, for each segment, the corresponding control code is arranged in a preceding segment in the refresh process.

13. The method of claim 11, wherein the control codes are implemented in a table for access by the refresh process.

14. An image display system, comprising:
    a display;
    a processor configured as a central processing unit (CPU), the CPU being a microcode-controlled processor having a CPU-internal micro program memory for storing microcode words and execution circuitry for executing the microcode words, the CPU-internal micro program memory comprising microcode words for controlling an internal operation of the CPU, and a special sequence of microcode words for performing compression;

a main memory associated with the processor, the main memory having an uncompressed image area for storing image data, the uncompressed image area being divided into segments, and a corresponding compressed image area for storing compressed image data; and circuitry for decompression and video signal generation, wherein the processor is configured to perform compression according to a first transformation process to ensure a given level of compression by executing, after changes have been made in the uncompressed image area, said special sequence of microcode words in said CPU-internal micro program memory, for reading and compressing segments of the uncompressed image area that are subject to said changes, each segment able to be independently compressed and decompressed, wherein the processor is configured to perform further compression, when there is available processing time, according to a second transformation process to improve the compression level by selecting one or more segments to work on and further compress the data, wherein said processor is configured to store the compressed segments of the image data in said compressed image area of the main memory of the processor, each segment having a dedicated space, wherein the circuitry for decompression and video signal generation is configured to decompress compressed image data fetched from the compressed image area to generate an appropriate image signal based on data from the compressed image area and to apply the generated image signal to said display to refresh said image, and wherein the processor is configured to enable refresh of an image only with the compressed image data in the main memory of the processor.

15. The image display system of claim 14, wherein said special sequence of microcode words in said micro program memory is adapted for allowing changes of a limited part of the image contents without having to recompress the entire image.

16. The image display system of claim 14, wherein said special sequence of microcode words in said micro program memory is adapted for performing compression on a rectangular area of said image corresponding to the smallest rectangle containing said changes.

17. The image display system of claim 16, wherein said rectangular area of said image has a number of line segments, which when compressed by said special sequence of microcode words are written one at a time without interruption into the compressed image area of the main memory.

18. The image display system of claim 17, wherein each line segment can be compressed and decompressed independently of all other line segments in said rectangular area.

19. The image display system of claim 14, wherein said special sequence of microcode words in said micro program memory causes writing the compressed parts of the image into said compressed image area of the main memory of the processor in a way that ensures that only complete image objects are output to the compressed image area.

20. The image display system of claim 14, wherein said special sequence of microcode words is a part of the microcode words in the micro program memory that is triggered as and when needed for compressing at least parts of the uncompressed image area that are subject to said changes, and compressed image data is fetched from the compressed image area in phase with the refresh scanning of the display.

21. The image display system of claim 14, wherein said processor is configured to execute the microcode-implemented compressing time-shared with ordinary control operations of the microcode-controlled processor.

22. The image display system of claim 14, wherein said main memory includes an application program, which when executed by said processor performs changes in the image in the uncompressed image area and calls a routine for making the changes visible on the display, wherein said routine initiates said special sequence of microcode words stored in the micro program memory.

23. The image display system of claim 14, wherein said processor is implemented as a microcontroller core formed in an integrated circuit.

24. The image display system of claim 14, wherein said circuitry configured to decompress the compressed image data fetched from the compressed image area comprises decompression logic with associated memory buffers, and the compressed image data is transferred from the compressed image area to the decompression logic by a direct memory access (DMA) unit.

25. The image display system of claim 24, wherein said DMA unit is implemented within said microcode-controlled processor and the direct memory access process is implemented by a special sequence of microcode words in the internal micro program memory.

26. A processor for use in an image display system and adapted for cooperating with a main memory having an uncompressed image area for storing image data, the uncompressed image area being divided into segments, and a compressed image area for storing compressed image data, the processor comprising:

a central processing unit (CPU), the CPU being a microcode-controlled processor having a CPU-internal micro program memory for storing microcode words, and execution circuitry for executing the microcode words, wherein the CPU-internal micro program memory comprises microcode words for controlling an internal operation of the CPU, and a special sequence of microcode words for performing compression, wherein the processor is configured to perform compression according to a first transformation process to ensure a specific level of compression by executing, after changes have been made in the uncompressed image area, said special sequence of microcode words in said CPU-internal micro program memory, for reading and compressing segments of the uncompressed image area that are subject to said changes, compression of one of the segments being independent of the other segments, wherein the processor is configured to perform further compression, when there is available processing time, according to a second transformation process to improve the compression level by selecting one or more segments to work on and further compress the data, wherein said processor is configured to store the compressed segments of the image data in said compressed image area of the main memory of the process, each segment having a dedicated space, and wherein the processor is configured to enable refreshing of an image only with the compressed image data in the main memory of the processor.

27. The processor of claim 26, wherein said special sequence of microcode words in said micro program memory is adapted for allowing changes of a limited part of the image contents without having to recompress the entire image.

28. The processor of claim 26, wherein said processor is operable for executing the microcode-implemented compressing time-shared with ordinary control operations of the microcode-controlled processor.

29. The processor of claim 26, wherein said main memory includes an application program, which when executed by said processor performs changes in the image in the uncompressed image area and calls a routine for making the changes visible on a screen, wherein said routine initiates said special sequence of microcode words stored in the micro program memory.

30. The processor of claim 26, wherein said processor is implemented as a microcontroller core formed in an integrated circuit.

\* \* \* \* \*

UNITED STATES PATENT AND TRADEMARK OFFICE
CERTIFICATE OF CORRECTION

PATENT NO. : 8,471,861 B2  Page 1 of 1
APPLICATION NO. : 12/159090
DATED : June 25, 2013
INVENTOR(S) : Stefan Blixt It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 991 days.

Signed and Sealed this
Eighth Day of September, 2015

Michelle K. Lee
*Director of the United States Patent and Trademark Office*